United States Patent
Tateno et al.

(10) Patent No.: US 10,189,162 B2
(45) Date of Patent: Jan. 29, 2019

(54) MODEL GENERATION APPARATUS, INFORMATION PROCESSING APPARATUS, MODEL GENERATION METHOD, AND INFORMATION PROCESSING METHOD

(71) Applicant: CANON KABUSHIKI KAISHA, Tokyo (JP)

(72) Inventors: Keisuke Tateno, Kawasaki (JP); Hisayoshi Furihata, Tokyo (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 787 days.

(21) Appl. No.: 13/788,237

(22) Filed: Mar. 7, 2013

(65) Prior Publication Data
US 2013/0245828 A1    Sep. 19, 2013

(30) Foreign Application Priority Data

Mar. 13, 2012 (JP) ................................. 2012-056489
Jul. 27, 2012 (JP) ................................. 2012-167647

(51) Int. Cl.
*B25J 9/16*      (2006.01)
*G06T 17/00*     (2006.01)
(Continued)

(52) U.S. Cl.
CPC ........ *B25J 9/1697* (2013.01); *G06K 9/00214* (2013.01); *G06T 7/75* (2017.01);
(Continued)

(58) Field of Classification Search
CPC ........... H04N 13/0239; H04N 13/0055; H04N 13/0221; H04N 19/00769
See application file for complete search history.

(56) References Cited

U.S. PATENT DOCUMENTS 5,649,076 A   *   7/1997   Nishizaka ............... G06T 17/10
                                                         345/419
6,792,370 B2      9/2004   Satoh et al.
(Continued)

FOREIGN PATENT DOCUMENTS

CN        101261118 A     9/2008
CN        101909828 A     12/2010
(Continued)

OTHER PUBLICATIONS

C. Kemp, et al., "Dynamic Measurement Clustering to Aid Real Time Tracking," ICCV, Tenth IEEE International Conference on Computer Vision, vol. 2, pp. 1500-1507 (2005).
(Continued)

*Primary Examiner* — Shawn S An
(74) *Attorney, Agent, or Firm* — Venable LLP

(57) ABSTRACT

A three-dimensional shape model of a target object is input. A position and orientation of at least one image sensing device used to capture an image of the target object is set so as to virtually set a relative position and orientation between the target object and the image sensing device for the three-dimensional shape model of the target object. At least one position and orientation of the image sensing device is selected. Geometric features are grouped based on a relationship between an image to be obtained at the selected position and orientation of the image sensing device and the geometric features of the three-dimensional shape model.

8 Claims, 13 Drawing Sheets

(51) Int. Cl.
    *G06K 9/00*     (2006.01)
    *G06T 7/73*     (2017.01)

(52) U.S. Cl.
    CPC .... *G06T 17/00* (2013.01); *G06T 2207/10004* (2013.01); *G06T 2207/10012* (2013.01); *G06T 2207/10028* (2013.01)

(56) References Cited

U.S. PATENT DOCUMENTS

| | | | |
|---|---|---|---|
| 6,993,450 | B2 | 1/2006 | Takemoto et al. |
| 7,092,109 | B2 | 8/2006 | Satoh et al. |
| 7,130,754 | B2 | 10/2006 | Satoh et al. |
| 7,664,341 | B2 | 2/2010 | Takemoto et al. |
| 7,848,903 | B2 | 12/2010 | Aratani et al. |
| 7,860,345 | B2 | 12/2010 | Satoh et al. |
| 8,223,146 | B2 | 7/2012 | Kotake et al. |
| 8,346,392 | B2 | 1/2013 | Walser et al. |
| 9,317,735 | B2 * | 4/2016 | Watanabe .......... G06K 9/00201 |
| 2010/0142826 | A1 | 6/2010 | Kotake et al. |
| 2010/0289797 | A1 * | 11/2010 | Tateno .................. G06T 7/0046 345/419 |
| 2010/0328682 | A1 | 12/2010 | Kotake et al. |
| 2012/0033071 | A1 | 2/2012 | Kobayashi et al. |
| 2012/0262455 | A1 | 10/2012 | Watanabe et al. |
| 2012/0275654 | A1 | 11/2012 | Fujiki et al. |
| 2013/0076865 | A1 | 3/2013 | Tateno et al. |
| 2013/0094706 | A1 * | 4/2013 | Nakazato ............... G01B 11/24 382/103 |
| 2013/0108116 | A1 | 5/2013 | Suzuki et al. |
| 2013/0114886 | A1 | 5/2013 | Kotake et al. |
| 2013/0121592 | A1 | 5/2013 | Fujiki et al. |
| 2013/0236062 | A1 | 9/2013 | Kotake et al. |
| 2013/0335751 | A1 | 12/2013 | Hirota et al. |

FOREIGN PATENT DOCUMENTS

| | | |
|---|---|---|
| JP | H08-313225 A | 11/1996 |
| JP | 2009-276166 A | 11/2009 |
| JP | 2012-128661 A | 7/2012 |

OTHER PUBLICATIONS

R. Tsai, "A Versatile Camera Calibration Technique for High-Accuracy 3D Machine Vision Metrology Using Off-the-Shelf Cameras and Lenses," IEEE Journal of Robotics and Automation, vol. No. 4, RA-3 (1987).

K. Tateno et al., "A Model Fitting Method Using Intensity and Range Images for Bin-Picking Applications," 13th Symposium on Meeting on Image Recognition and Understanding, (MIRU 2010).

Y. Hel-Or et al., "Pose Estimation by Fusing Noisy Data of Different Dimensions," IEEE Transactions on Pattern Analysis and Machine Intelligence, vol. 17, No. 2, pp. 195-201 (1995).

May 18, 2015 Chinese Office Action in a foreign concerning counterpart application Chinese Patent Application No. 201310080566.5.

U. Klank, et al., "Real-time CAD Model Matching for Mobile Manipulation and Grasping", 9th IEEE-RAS International Conference on Humanoid Robots, Dec. 7-10, 2009, pp. 290-296.

Z. Lian, et al., "Visual Similarity based 3D Shape Retrieval Using Bag-of-Features", 2010 Shape Modeling International Conference, pp. 25-36.

Extended European Search Report dated Jun. 28, 2013 in European Patent Application No. 13158198.5.

* cited by examiner

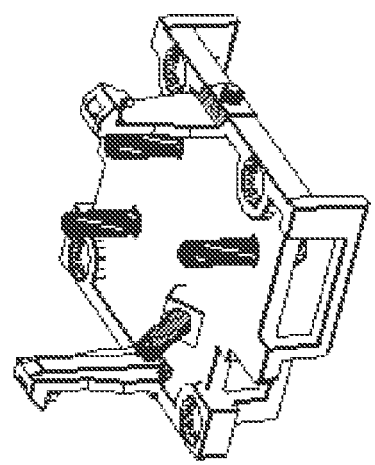
FIG. 2C OBJECT SHAPE
FIG. 2B PLANE GEOMETRIC FEATURE
FIG. 2A LINE GEOMETRIC FEATURE

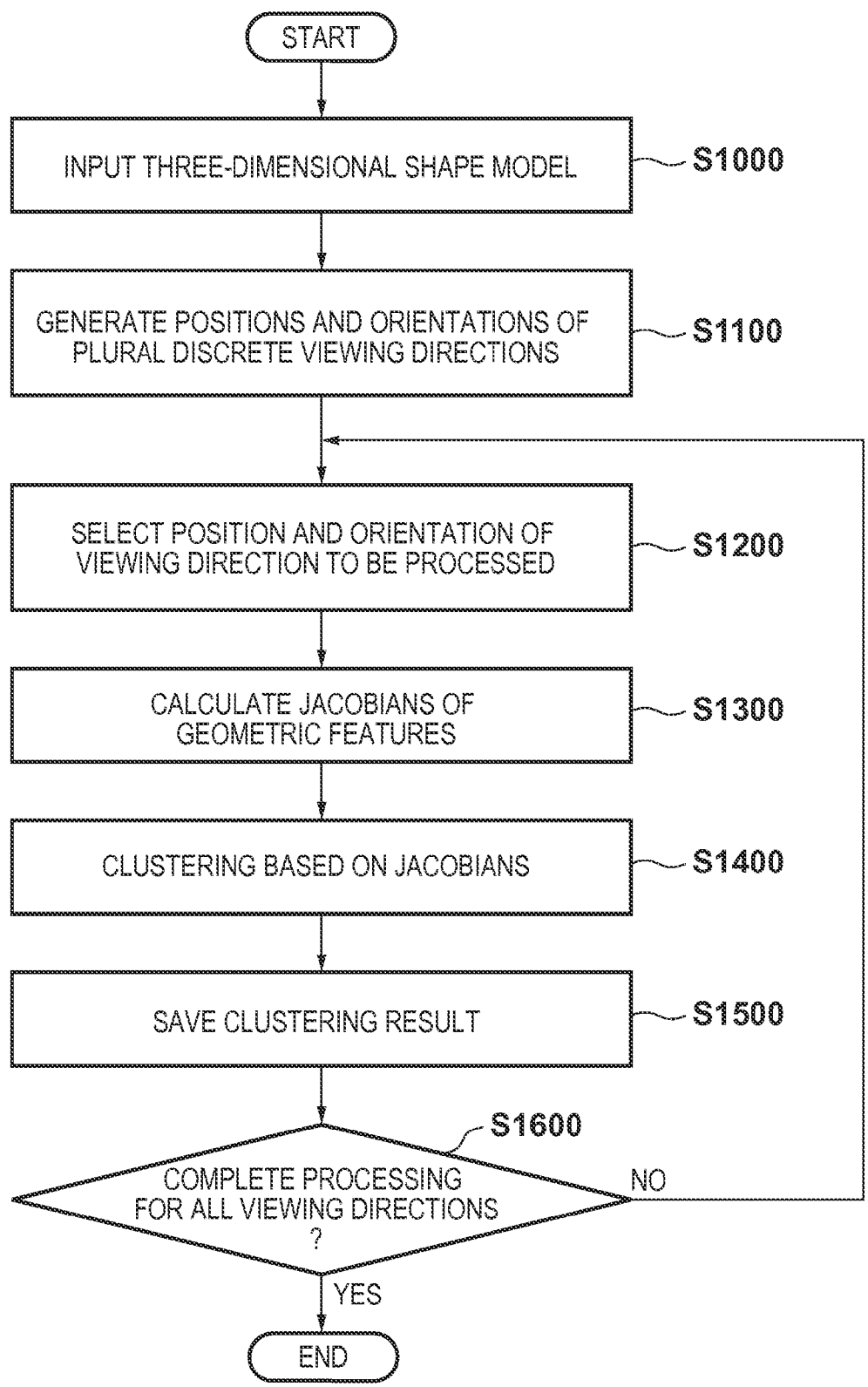

F I G. 7
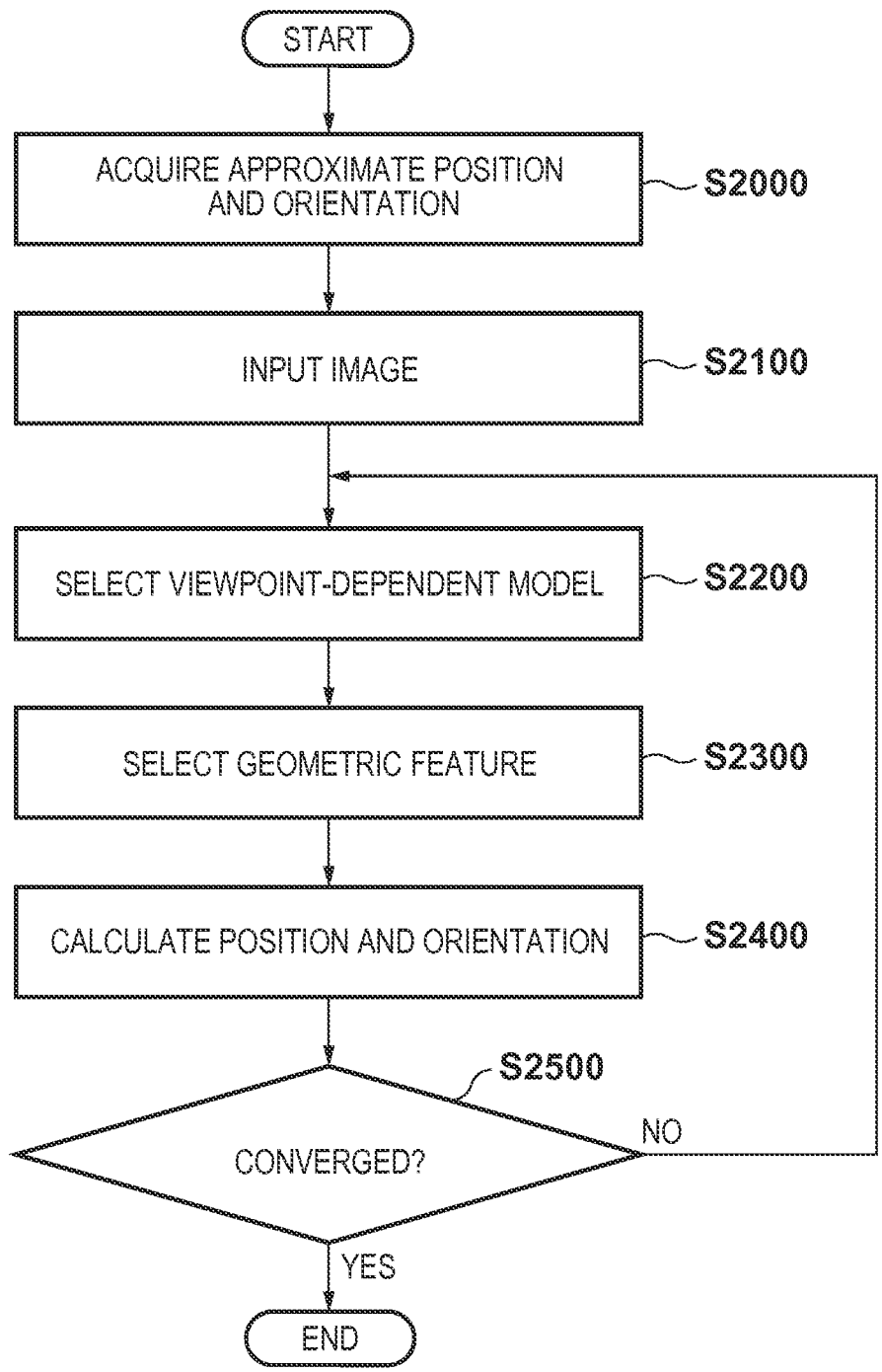

F I G. 12D

| POINT | x | y | z |
|---|---|---|---|
| P1 | 0 | 0 | 0 |
| P2 | 20 | 140 | 0 |
| P3 | 80 | 140 | 0 |
| P4 | 100 | 0 | 0 |
| P5 | 0 | 0 | 600 |
| P6 | 20 | 140 | 600 |
| P7 | 80 | 140 | 600 |
| P8 | 100 | 0 | 600 |

F I G. 12E

| LINE | TWO POINTS AT TWO ENDS |
|---|---|
| L1 | P1, P2 |
| L2 | P2, P3 |
| L3 | P3, P4 |
| L4 | P1, P4 |
| L5 | P2, P6 |
| L6 | P3, P7 |
| L7 | P4, P8 |
| L8 | P1, P5 |
| L9 | P5, P6 |
| L10 | P6, P7 |
| L11 | P7, P8 |
| L12 | P5, P8 |

F I G. 12F

| SURFACE | SURROUNDING LINES | NORMAL (x,y,z) |
|---|---|---|
| S1 | L1, L2, L3, L4 | (0, 0, -1) |
| S2 | L1, L5, L8, L9 | (-0.88, 0.12, 0) |
| S3 | L2, L5, L6, L10 | (0, 1, 0) |
| S4 | L3, L6, L7, L11 | (0.88, 0.12, 0) |
| S5 | L4, L7, L8, L12 | (0, -1, 0) |
| S6 | L9, L10, L11, L12 | (0, 0, 1) |

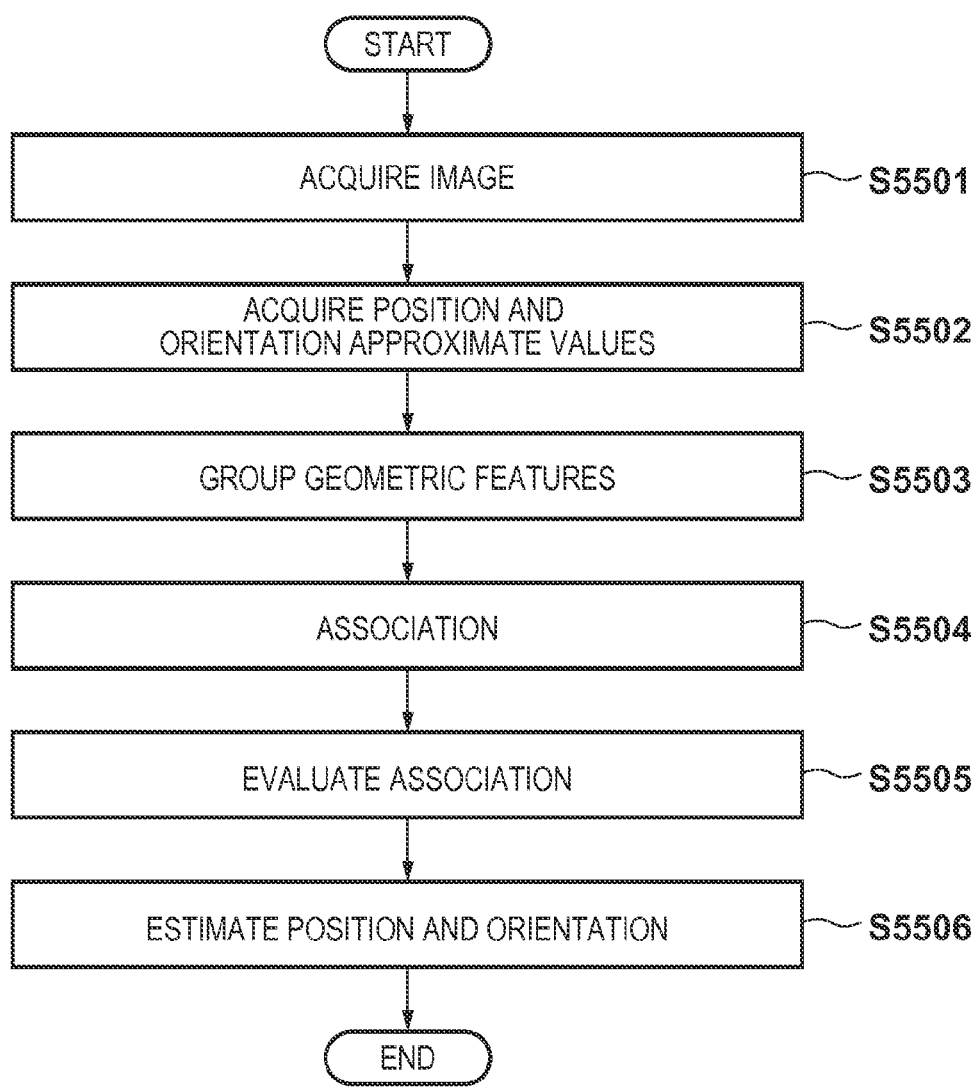

MODEL GENERATION APPARATUS, INFORMATION PROCESSING APPARATUS, MODEL GENERATION METHOD, AND INFORMATION PROCESSING METHOD

BACKGROUND OF THE INVENTION

Field of the Invention

The present invention relates to a technique for measuring a position and orientation of an object.

Description of the Related Art

In recent years, robots are gradually handling complicated tasks such as assembling industrial products in place of human beings. In assembling of industrial products by robots, a relative position and orientation between components has to be precisely measured so as to grip a component by an end effector such as a robot hand. As a method of measuring a position and orientation, measurements by model fitting, which fits a three-dimensional shape model to features detected from a grayscale image captured by a camera or a range image obtained from a range sensor are generally used. Of such methods, non-patent literature 1 (Christopher Kemp, Tom Drummond, "Dynamic Measurement Clustering to Aid Real Time Tracking," iccv, vol. 2, pp. 1500-1507, Tenth IEEE International Conference on Computer Vision (ICCV'05) Volume 2, 2005.) discloses a method of estimating a position and orientation at high speed by efficiently selecting features (three-dimensional points, lines, planes, and the like; to be referred to as geometric features hereinafter) in a three-dimensional shape model. The method disclosed in non-patent literature 1 groups geometric features in a three-dimensional shape model into geometric feature groups which have similar influences on parameters that express a position and orientation to be estimated. Then, a position and orientation is estimated based on a small number of geometric features selected from the respective groups. This method calculates which of six degrees of freedom parameters, that together express a position and orientation, a geometric feature readily influences. The calculation is performed by calculating, for each of the geometric features, a change amount (to be referred to as a Jacobian hereinafter) of that geometric feature when each of the six parameters of the degrees of freedom of the position and orientation is minimally changed.

However, the method according to non-patent literature 1 suffers the following problem. That is, since grouping processing of geometric features is executed during model fitting processing, processing cost of the grouping processing of geometric features increases depending on the number of geometric features and grouping methods, thus impairing the speed of the model fitting processing.

SUMMARY OF THE INVENTION

The present invention has been made in consideration of the above problem, and provides a technique which reduces the probability of impairing the speed of grouping processing of geometric features based on Jacobians and allows efficient model fitting when measuring a position and orientation of an object.

According to the first aspect of the present invention, a model generation apparatus comprises: a model input unit that inputs a three-dimensional shape model of a target object; a setting unit that sets at least one position and orientation of at least one image sensing device for capturing an image of the target object thereby setting a virtual relative position and orientation between the target object and the image sensing device for the three-dimensional shape model of the target object; a selection unit that selects at least one position and orientation of the image sensing device set by the setting unit; and a grouping unit that groups geometric features based on a relationship between an image to be obtained at the position and orientation of the image sensing device selected by the selection unit and the geometric features of the three-dimensional shape model.

According to the second aspect of the present invention, an information processing apparatus comprises: the above model generation apparatus; an image input unit that inputs an image captured by an image sensing device; a geometric feature selection unit that selects geometric features from groups grouped by the grouping unit; and a calculation unit that calculates a position and orientation of the target object or the image sensing device so that features of the image input by the image input unit and the geometric features selected by the geometric feature selection unit correspond with each other.

According to the third aspect of the present invention, a model generation method for execution by a model generation apparatus, comprises: inputting a three-dimensional shape model of a target object; setting at least one position and orientation of at least one image sensing device used to capture an image of the target object thereby setting least one virtual relative position and orientation between the target object and the virtual image sensing device for the three-dimensional shape model of the target object; selecting at least one position and orientation of the image sensing device set in the setting step; and grouping geometric features based on a relationship between an image to be obtained at the position and orientation of the image sensing device selected in selection step and the geometric features of the three-dimensional shape model.

According to the fourth aspect of the present invention, an information processing method for execution by an information processing apparatus comprising the above model generation apparatus, the method comprises: inputting an image captured by an image sensing device; selecting geometric features from groups grouped by the grouping unit; and calculating a position and orientation of the target object or the image sensing device so that features of the image input in the image input step and the geometric features selected in the geometric feature selection step correspond with each other.

Further features of the present invention will become apparent from the following description of embodiments with reference to the attached drawings.

BRIEF DESCRIPTION OF THE DRAWINGS

FIGS. 2A to 2C are views for explaining components of a three-dimensional shape model according to a first embodiment of the present invention;

FIG. 3 is a flowchart showing the processing sequence of a model generation method according to the first embodiment of the present invention;

FIG. 7 is a flowchart showing the processing sequence of a position and orientation estimation method according to the first embodiment of the present invention;

FIGS. 12A to 12F are views for explaining a configuration example of model information;

FIG. 13 is a flowchart of processing to be executed by the information processing apparatus 5300.

DESCRIPTION OF THE EMBODIMENTS

Figure 1:
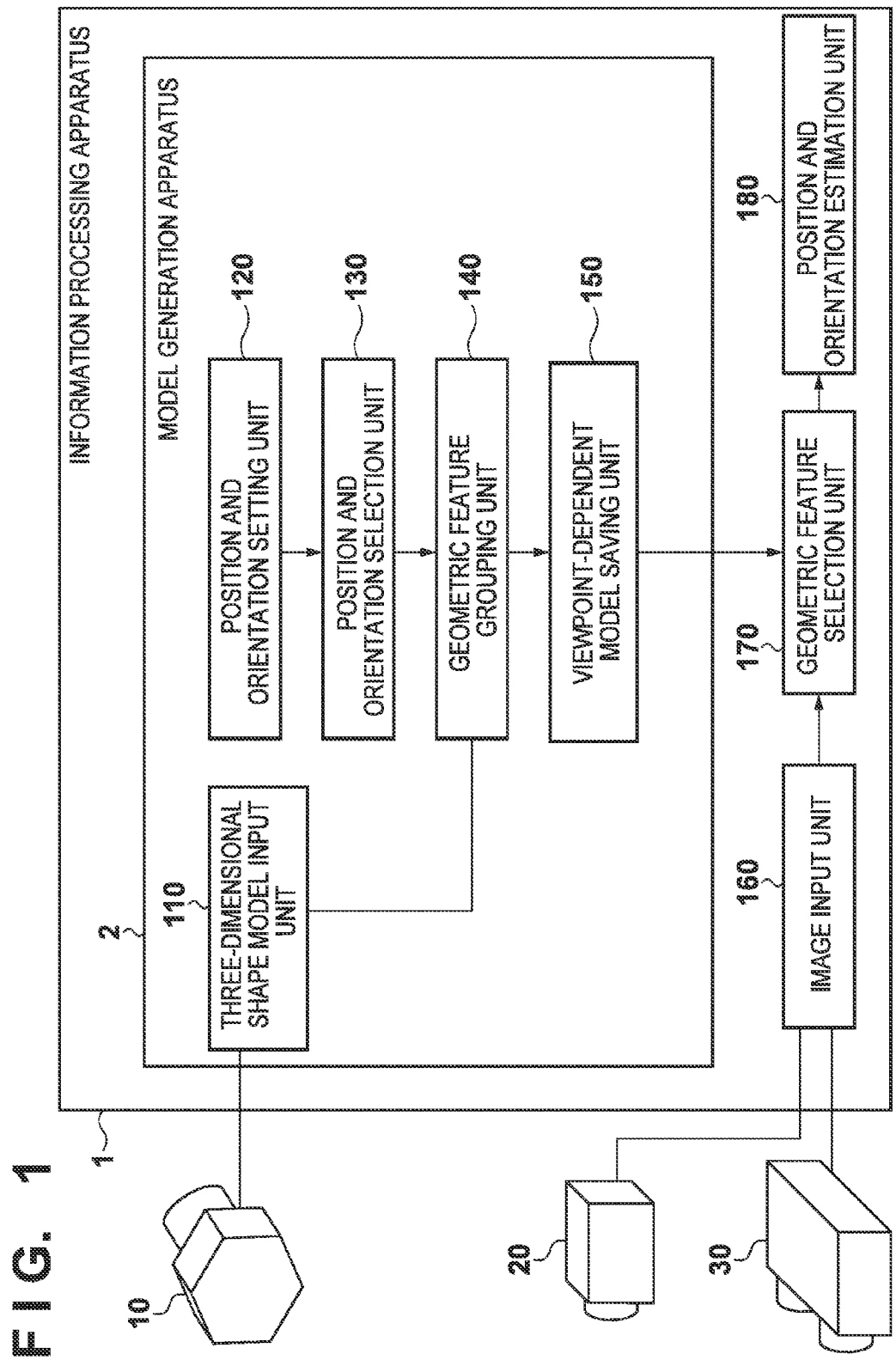
FIG. 1 is a block diagram showing the arrangement of an information processing apparatus according to an embodiment of the present invention.

Embodiments of the present invention will be described in detail hereinafter with reference to the accompanying drawings.

First Embodiment

This embodiment comprises a generation method of a position and orientation estimation model required to estimate a position and orientation of an object using an information processing apparatus of the present embodiment. It also encompasses an estimation method of a position and orientation of an object using the generated position and orientation estimation model.

Note that "position and orientation of object" in the following description means the relationship between the position and orientation of an object and that of an image sensing device used to capture an image of the object.

In the position and orientation estimation method of this embodiment, three-dimensional geometric features in a three-dimensional shape model, and image features in a two-dimensional image and distance points in a range image are associated with each other based on an approximate position and orientation given as initial values. Then, the position and orientation is iteratively corrected to minimize a sum of associated distances, thereby calculating the position and orientation of the object.

Note that geometric features used in position and orientation estimation processing have different degrees of contribution on each parameter of six-degrees-of-freedom parameters (position: three degrees of freedom, orientation: three degrees of freedom) which express a position and orientation. For this reason, when geometric features used in the position and orientation estimation processing contribute to only some of the six-degrees-of-freedom parameters, estimation of the six degrees of freedom of the position and orientation fails (only some parameters can only be estimated), or a large number of geometric features are required to correctly estimate the position and orientation, thus posing problems.

Thus, in order to efficiently estimate the six degrees of freedom of a position and orientation, it is important to select and use geometric features whose influence on the six-degrees-of-freedom parameters of the position and orientation are not similar, in a balanced manner.

Hence, in this embodiment, geometric features whose influences on position and orientation estimation parameters are similar grouped as geometric feature groups, and the position and orientation estimation processing is executed by selectively using geometric feature groups having different influences on the position and orientation parameters, thereby implementing efficient estimation processing.

However, the influences of geometric features on the position and orientation parameters vary depending on viewing conditions of an object (a relative position and orientation between an object and an image sensing device used to view the object, internal parameters of the image sensing device, and the like). For this reason, these influences cannot be calculated in a pre-processing stage in which a viewing condition is not determined.

Hence, in this embodiment, as pre-processing required to estimate a position and orientation of an object, a grouping processing of geometric features is executed under various viewing conditions which are discretely set in advance for a three-dimensional shape model, and grouping results of geometric features are saved for respective viewing conditions.

Then, the position and orientation estimation is executed using a grouping result of geometric features processed using the viewing condition determined to be closest to an actual or estimated viewing condition at the position and orientation estimation timing.

Model generation processing will be described hereinafter as pre-processing of the position and orientation estimation processing. After that, processing for estimating a position and orientation of an object using a position and orientation calculation model (to be described later) generated by the model generation processing will be described.

FIG. 1 shows the arrangement of a model generation apparatus 2 which generates viewpoint-dependent position and orientation estimation models as the pre-processing in this embodiment, and an information processing apparatus 1 which calculates a position and orientation using the position and orientation estimation model.

As shown in FIG. 1, the model generation apparatus 2 includes a three-dimensional shape model input unit 110, position and orientation setting unit 120, position and orientation selection unit 130, geometric feature grouping unit 140, and viewpoint-dependent model saving unit 150. Furthermore, the information processing apparatus 1 includes the model generation apparatus 2, an image input unit 160, a geometric feature selection unit 170, and a position and orientation estimation unit 180. The arrangement shown in FIG. 1 is an application example of an information processing apparatus of the present embodiment.

Respective units included in the model generation apparatus 2 will be described below.

The three-dimensional shape model input unit 110 inputs a three-dimensional shape model 10 which expresses a shape of an object. FIGS. 2A and 2B are views showing an example of a three-dimensional shape model, and FIG. 2C shows a polygon model which expresses a shape of an object.

As shown in FIGS. 2A to 2C, a three-dimensional shape model is configured by three-dimensional plane information (to be referred to as plane geometric features hereinafter) and three-dimensional line segment information (to be referred to as line geometric features hereinafter). Note that each plane geometric feature is local three-dimensional plane information on an object surface, which includes three-dimensional positions and a three-dimensional normal direction, and each line geometric feature is local three-dimensional line segment information on an object contour, which includes three-dimensional positions and a three-dimensional line segment direction.

As an example of a three-dimensional shape model, data obtained by capturing an image of a target object may be used in addition to a CAD model. Note that in this embodiment, "geometric features" generally indicates both plane and line geometric features.

A plane geometric feature is used to measure corresponding distances between three-dimensional coordinates of the plane geometric feature and a distance point group on a range image. A line geometric feature is used to measure corresponding distances between projected coordinates of the line geometric feature and an edge on a grayscale image. A three-dimensional shape model is saved in the three-dimensional shape model input unit 110, and is input to the geometric feature grouping unit 140.

The position and orientation setting unit 120 sets a plurality of different viewing conditions for a three-dimensional shape model. Note that in this embodiment, a position and orientation of a virtual image sensing device used to view a three-dimensional shape model is generated exhaustively as viewing conditions to discretely view the model from various directions. A practical processing method of position and orientation settings of an image sensing device will be described later. Note that an image sensing device which is virtually disposed will be referred to as a virtual image sensing device hereinafter.

The position and orientation selection unit 130 selects one of a plurality of viewing conditions for the three-dimensional shape model set by the position and orientation setting unit 120. Note that in this embodiment, the position and orientation selection unit 130 selects one set of positions and orientations of a plurality of virtual image sensing devices for the three-dimensional shape model. Practical processing will be described later.

The geometric feature grouping unit 140 groups geometric features based on similarities of Jacobians of the geometric features for each viewing condition selected by the position and orientation selection unit 130 of the plurality of viewing conditions set by the position and orientation setting unit 120. In this embodiment, the geometric feature grouping unit 140 executes clustering based on similarities of influences of geometric features on the position and orientation parameters as grouping. Details of practical processing will be described later.

The viewpoint-dependent model saving unit 150 saves geometric feature information grouped by the geometric feature grouping unit 140 together with the viewing condition at that time (relative position and orientation information between the three-dimensional shape model used for grouping and virtual image sensing device) as a viewpoint-dependent position and orientation estimation model. A position and orientation estimation model is generated by combining viewpoint-dependent position and orientation estimation models of all the viewing conditions set by the position and orientation setting unit 120 into one.

Respective units included in the information processing apparatus 1 will be described below.

A two-dimensional image sensing device 20 is a camera used to capture a normal two-dimensional image. A two-dimensional image to be captured may be either a grayscale image or color image. In this embodiment, the two-dimensional image sensing device 20 captures and outputs a grayscale image.

An image captured by the two-dimensional image sensing device 20 is input to the information processing apparatus 1 via the image input unit 160. Intrinsic parameters such as a focal length, principal point position, lens distortion parameters, and the like of the camera may be acquired by referring to the specifications of a device to be used. Alternatively, such parameters may be acquired by executing calibration in advance by a method disclosed in [R. Y. Tsai, "A versatile camera calibration technique for high-accuracy 3D machine vision metrology using off-the-shelf cameras and lenses," IEEE Journal of Robotics and Automation, vol. RA-3, no. 4, 1987.].

A range image sensing device 30 measures three-dimensional information of points on an object surface as a measurement target. As the range image sensing device 30, a range sensor which outputs a range image is used. The range image is an image in which each pixel has depth information.

In this embodiment, as the range sensor, a one-shot active type sensor, which irradiates a target with multi-slit lines assigned color IDs of different wavelengths, captures reflected light using a camera, and makes distance measurements by triangulation, is used. However, the range sensor is not limited to this, for example, as an alternative, a Time-of-flight type sensor using a flight time of light may be used.

Also, a passive type sensor, which calculates depths of respective pixels by triangulation from an image captured by a stereo camera, may be used. In addition, any other sensors may be used as long as they measure a range image, such that the gist of the present invention will not be lost.

A range image measured by the range image sensing device 30 is input to the information processing apparatus 1 via the image input unit 160. Also, assume that optical axes of the range image sensing device 30 and two-dimensional image sensing device 20 are matched, and the correspondence relationship between respective pixels of a grayscale image output by the two-dimensional image sensing device 20 and those of a range image output by the range image sensing device 30 is given.

However, the application of the present invention is not limited to a case in which a grayscale image and range image have the same viewpoint. For example, an image sensing device used to capture a grayscale image and that used to capture a range image are located at different positions and orientations, and a grayscale image and range image may be captured from different viewpoints. In this case, assume that the relative position and orientation between the image sensing devices is given, and the grayscale image and range image are associated with each other by projecting a three-dimensional point group in the range image onto the grayscale image. The positional relationship between the image sensing devices is not particularly limited as long as a relative position and orientation between the image sensing devices used to capture images of an identical object is given, and the correspondence relationship between these images can be calculated.

The image input unit 160 inputs a two-dimensional image captured by the two-dimensional image sensing device 20 and a range image captured by the range image sensing device 30 to the information processing apparatus 1. The image input unit 160 is implemented by an analog video capture board when outputs of the image sensing devices are analog outputs such as NTSC outputs. Alternatively, the image input unit 160 is implemented by, for example, an IEEE1394 interface board if the outputs of the image sensing devices are digital outputs such as IEEE1394 outputs. Alternatively, the image input unit 160 may acquire images by reading out digital data of a still image or moving image, which is stored in advance in a storage device (not shown).

The geometric feature selection unit 170 selects geometric features used to calculate a position and orientation from those which are grouped by the geometric feature grouping unit 140 and are saved in the viewpoint-dependent model saving unit 150. Practical processing will be described later.

The position and orientation estimation unit 180 calculates associations with geometric features selected by the geometric feature selection unit 170 based on a grayscale image and range image captured by the two-dimensional image sensing device 20 and range image sensing device 30. Then, a position and orientation of a target object is calculated. Details of practical processing will be described later.

The example of the arrangement of the information processing apparatus 1 has been described. Note that the information processing apparatus 1 incorporates a computer. The computer includes a main control unit such as a CPU, a ROM (Read Only Memory), a RAM (Random Access Memory), and a storage unit such as an HDD (Hard Disk Drive). Also, to the computer, an input/output unit such as buttons, a display, or a touch panel, a communication unit such as a network card, and the like may be connected. Note that these components are connected via, for example, a bus, and are controlled when the main control unit executes programs stored in the storage unit.

The processing sequence of the position and orientation estimation model generation and the position and orientation estimation according to this embodiment will be described below. FIG. 3 is a flowchart showing the processing sequence of the position and orientation estimation model generation method according to this embodiment.

(Step S1000)

In step S1000, the three-dimensional shape model input unit 110 inputs a three-dimensional shape model of a target object.

(Step S1100)

In step S1100, the position and orientation setting unit 120 sets viewing conditions of the three-dimensional shape model of the target object. In this embodiment, as the viewing conditions, position and orientation settings of a virtual image sensing device used to view the three-dimensional shape model are made.

Figure 4:
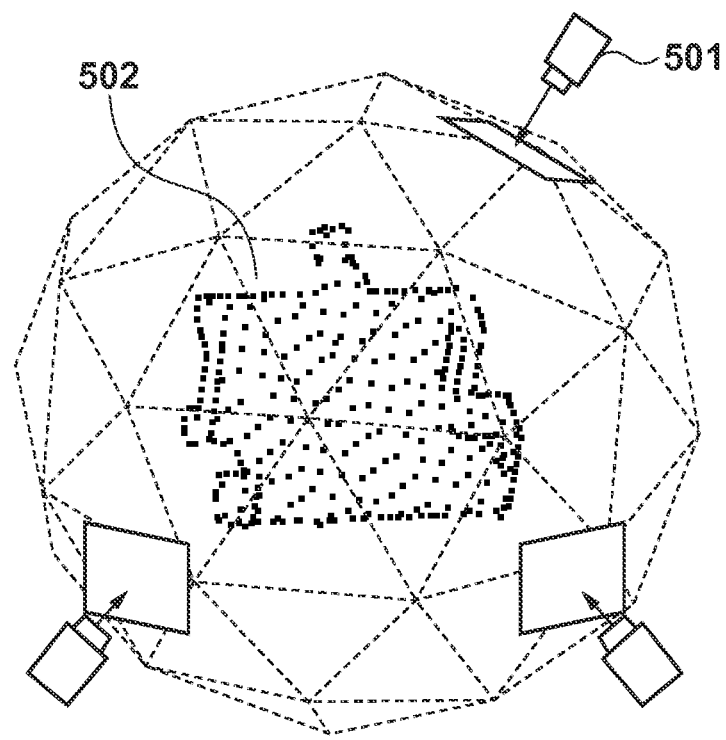
FIG. 4 is a view for explaining generation of discrete viewing conditions according to the first embodiment of the present invention.

Generation of exhaustive viewing conditions uses, for example, a geodesic sphere, which encloses an object, as shown in FIG. 4. More specifically, a reference position and orientation is set to have each vertex of the geodesic sphere as a position of a virtual image sensing device 501, and each viewing direction of a three-dimensional shape model 502 from there as a viewpoint of the virtual image sensing device 501. An image to be obtained when an image of the three-dimensional shape model is captured from the set position and orientation is an image obtained by mapping the three-dimensional shape model onto a plane corresponding to an image sensing plane of the virtual image sensing device. At this time, as for a roll direction of the virtual image sensing device 501, an arbitrary value may be set. Note that a radius of a sphere approximated by a geodesic sphere corresponds to a distance between the virtual image sensing device 501 and the three-dimensional shape model 502 of the target object.

Therefore, if an image sensing distance is assumed in advance in association with an image used in the position and orientation estimation, that distance is desirably set to be equal to the radius of the geodesic sphere. Alternatively, geodesic spheres whose sizes are different may be prepared at each step, and vertices of the respective geodesic spheres may be set as reference positions and orientations. However, the reference position and orientation setting method is not limited to this.

For example, a sphere which encloses the three-dimensional shape model of the target object may be assumed, latitudes and longitudes are assigned to that sphere like a globe, and viewpoints may be assured at equal intervals in the latitude and longitude directions. In addition, any other methods may be used as long as they can simulate relative positions and orientations between the virtual image sensing device and object in the actual position and orientation estimation. Upon completion of generation of positions and orientations of the virtual image sensing device based on respective vertices of the geodesic sphere, the process of step S1100 ends, and the process advances to step S1200.

(Step S1200)

In step S1200, the position and orientation selection unit 130 selects a position and orientation from a plurality of position and orientation conditions set in step S1100. More specifically, a position and orientation to be processed is selected and is set as a viewpoint of the virtual image sensing device used to view the three-dimensional shape model.

(Step S1300)

In step S1300, the geometric feature grouping unit 140 calculates Jacobians of geometric features using the position and orientation of the virtual image sensing device set in step S1200 so as to calculate similarities of influences on position and orientation parameters between geometric features. Note that a Jacobian of a geometric feature is a value which indicates a degree of a change in corresponding distance between a geometric feature of interest and image feature when parameters of six degrees of freedom of the position and orientation of the image sensing device change by a small amount.

More specifically, as for a line geometric feature, a Jacobian is a distance between a point and line on an image. Also, as for a plane feature, a Jacobian is a matrix including primary partial differential coefficients associated with respective elements of a position and orientation as elements when distances between points and a plane on a three-dimensional space are defined as functions of a position and orientation.

By checking a Jacobian of a geometric feature, a parameter of the six degrees of freedom of the position and orientation, on which that geometric feature readily influences, can be recognized. Note that this embodiment uses a Jacobian. However, the present invention is not limited to this, and indices which represent influences of geometric features on position and orientation parameters may be used. Derivation methods of Jacobians of plane and line geometric features will be described in detail below.

Figure 5A:
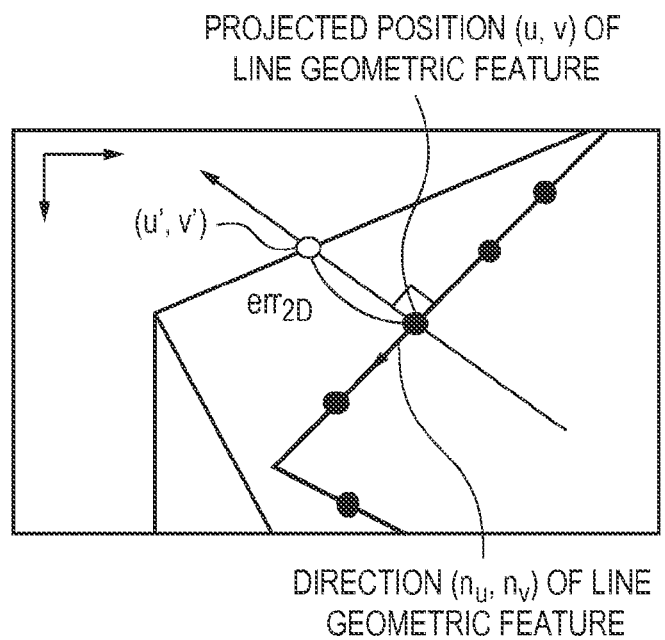
FIGS. 5A and 5B are views for explaining a method of associating geometric features and an image according to the first embodiment of the present invention.

Derivation of a Jacobian of a line geometric feature will be described first. FIG. 5A is a view for explaining calculations of a line-point distance between a line geometric feature and an image feature on a grayscale image. Let (u, v) be a position at which a line geometric feature is projected onto an image based on a position and orientation s of the virtual image sensing device, $(n_u, n_v)$ (unit vector) be a normal direction to that position, and (u', v') be coordinates of the image feature corresponding to the line geometric feature. An inter-correspondence signed distance $err_{2D}$ can be calculated by:

$$err_{2D} = n_u(u'-u) + n_v(v'-v) \quad (1)$$

Note that degrees of freedom of the position and orientation s of the virtual image sensing device are six degrees of freedom. That is, s is a six-dimensional vector, which includes three elements s1, s2, and s3 that express a position of a measurement target object, and three elements s4, s5, and s6 that express an orientation. The three elements that express the orientation are expressed using Euler angles, by a three-dimensional vector in which directions express rotation axes passing through an origin and a norm expresses a rotation angle, or the like. By partially differentiating the inter-correspondence distance $err_{2D}$ by the respective parameters of the position and orientation s of this virtual image sensing device, the following Jacobian matrix of a line feature is calculated:

$$J_{2D} = \begin{bmatrix} \frac{\partial err_{2D}}{\partial s_1} & \frac{\partial err_{2D}}{\partial s_2} & \frac{\partial err_{2D}}{\partial s_3} & \frac{\partial err_{2D}}{\partial s_4} & \frac{\partial err_{2D}}{\partial s_5} & \frac{\partial err_{2D}}{\partial s_6} \end{bmatrix} \quad (2)$$

Figure 5B:
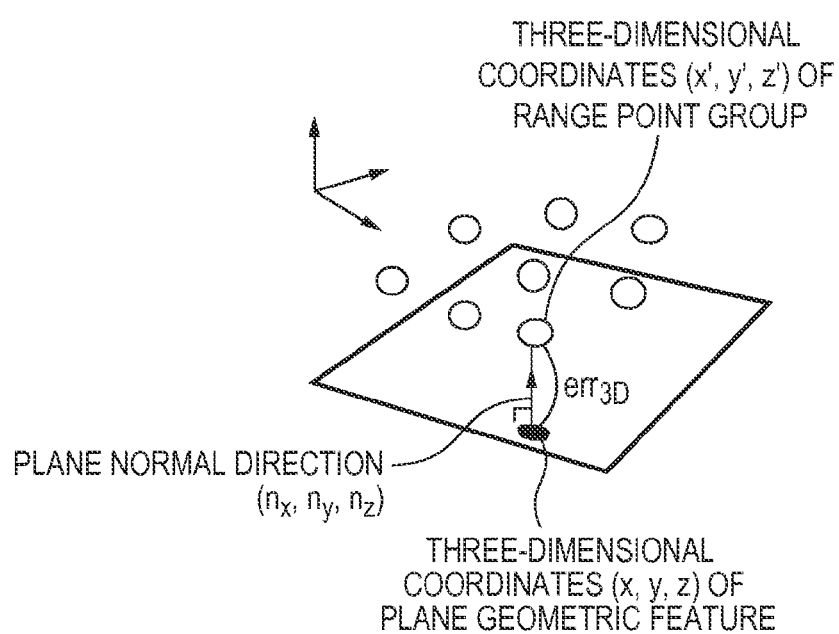

Next, derivation of a Jacobian of a plane geometric feature will be described below. FIG. 5B is a view for explaining a plane-point distance between a plane geometric feature and a corresponding point (three-dimensional point in a range image). Let (x, y, z) be three-dimensional coordinates of a plane geometric feature on a camera coordinate system, $(n_x, n_y, n_z)$ be a normal direction (unit vector), and (x', y', z') be coordinates of a three-dimensional point on the range image corresponding to a plane geometric feature point. A signed distance $err_{3D}$ on a three-dimensional space at that time can be calculated by:

$$err_{3D} = n_x(x'-x) + n_y(y'-y) + n_z(z'-z) \quad (3)$$

Then, in the same manner as the Jacobian of the line geometric feature, by partially differentiating the inter-correspondence distance $err_{3D}$ by the respective parameters of the position and orientation s of the virtual image sensing device, a Jacobian matrix of the plane feature can be calculated as follows:

$$J_{3D} = \begin{bmatrix} \frac{\partial err_{3D}}{\partial s_1} & \frac{\partial err_{3D}}{\partial s_2} & \frac{\partial err_{3D}}{\partial s_3} & \frac{\partial err_{3D}}{\partial s_4} & \frac{\partial err_{3D}}{\partial s_5} & \frac{\partial err_{3D}}{\partial s_6} \end{bmatrix} \quad (4)$$

Upon completion of calculations of the aforementioned Jacobians for all line and plane features, the process of step S1300 ends, and the process advances to step S1400.

(Step S1400)

In step S1400, the geometric feature grouping unit 140 groups features having similar influences on estimation of the six degrees of freedom of the position and orientation based on the Jacobians of the line and plane geometric features calculated in step S1300.

In this embodiment, geometric features are grouped by executing, for example, hierarchical clustering using the well known Ward method based on the similarities of the Jacobians. Note that since the Jacobians of the line geometric features and those of the plane geometric features have different scales of inter-correspondence distances to be measured, they are distinguished from each other, and are independently grouped.

Figure 6:
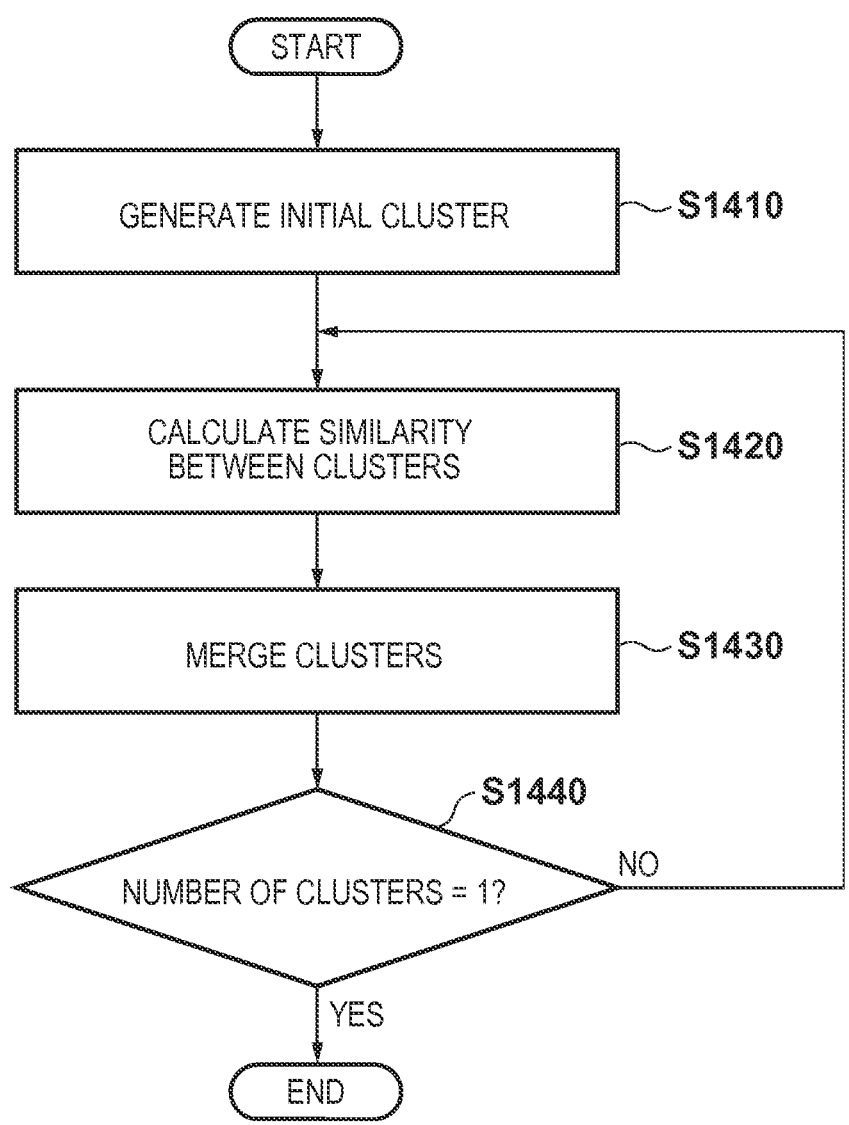
FIG. 6 is a flowchart showing the processing sequence of a grouping method of geometric features according to the first embodiment of the present invention.

Practical processing of grouping of the line and plane geometric features in step S1400 will be described in detail below with reference to the flowchart shown in FIG. 6.

(Step S1410)

In step S1410, as an initial cluster, a cluster group including only one geometric feature is generated. That is, when the total number of geometric features is N, N clusters are generated. The generated clusters are saved as those of a lowermost layer.

(Step S1420)

Next, similarities of Jacobians between clusters are calculated for all combinations between clusters. Since a value calculated by the Ward method becomes smaller as a similarity is higher, in a strict sense, a non-similarity is calculated in this case. Let $J_{ki}^A$ (k=1, ... , 6) be a Jacobian of a geometric feature as an i-th (i=1, ... , $n_A$) element of a certain cluster {A} having $n_A$ elements. Also, let $J_{kj}^B$ (k=1, ... , 6) be a Jacobian of a geometric feature as a j-th (j=1, ... , $n_B$) element of a certain cluster {B} having $n_B$ elements. An inter-cluster similarity between the clusters {A} and {B} is calculated by:

$$\Delta S_{AB} = \frac{n_A n_B}{n_A + n_B} \sum_{k=1}^{6} \left( \frac{1}{n_A} \sum_{i=1}^{n_A} J_{ki}^A - \frac{1}{n_B} \sum_{j=1}^{n_B} J_{kj}^B \right)^2 \quad (5)$$

After completion of calculations of the non-similarities $\Delta S_{AB}$ between the clusters for all the combinations between the clusters, the process of step S1420 ends, and the process advances to step S1430.

(Step S1430)

Next, by referring to the similarities calculated in step S1420, clusters of a combination having the lowest non-similarity $\Delta S_{AB}$ are merged to form one cluster. Then, the merged cluster is saved as that of a layer upper by one than the clusters before merging.

(Step S1440)

If the total number of clusters is 1 as result of step S1430, the processing ends; otherwise, the process returns to step S1420 to repeat the processing until the total number of clusters becomes 1.

With the aforementioned processing, geometric features can be grouped into a dendritic classification structure called a dendrogram. When the dendrogram is cut at a position close to a distal end of a branch (lower layer), a large number of clusters each including a small number of elements are obtained; when it is cut at a position close to a stool of a branch (upper layer), a small number of clusters each including a large number of elements are obtained.

That is, since clusters included in the dendrogram have a hierarchical structure, that is, small classification—middle classification—large classification, when they are cut at an arbitrary layer, an arbitrary number of clusters can be obtained.

The aforementioned processing is respectively applied to plane geometric features and line geometric features. Upon completion of grouping of all the plane geometric features and that of all the line geometric features, the process of step S1400 ends, and the process advances to step S1500.

(Step S1500)

Next, in step S1500, the viewpoint-dependent model saving unit 150 saves a set of the grouping result of the geometric features obtained in step S1400 and the position and orientation of the virtual image sensing device selected in step S1200 as a viewpoint-dependent position and orientation estimation model.

(Step S1600)

Next, the model generation apparatus 2 determines in step S1600 whether or not the processes from step S1200 to step S1500 have been executed for all the positions and orientations of the virtual image sensing device generated in step S1100. If positions and orientations to be processed still remain, the process returns to step S1200 to repeat the processing for the next position and orientation.

On the other hand, if the processes have been executed for all the positions and orientations, the processing ends. As a result, viewpoint-dependent position and orientation estimation models are saved for all the set positions and orientations of the virtual image sensing device, thus obtaining a position and orientation estimation model.

A position and orientation estimation method using the position and orientation estimation model generated by the model generation apparatus 2 will be described below with reference to FIG. 7. FIG. 7 is a flowchart showing the position and orientation estimation processing. Note that the position and orientation estimation processing may be executed by an external apparatus by transferring the processing result of FIG. 3 to the external apparatus.

(Step S2000)

In step S2000, the information processing apparatus 1 inputs approximate values of a position and orientation of an object with respect to the image sensing device including the two-dimensional image sensing device 20 and range image sensing device 30. In this embodiment, the information processing apparatus 1 uses previous measurement values (at the previous time) as approximate position and orientation under the assumption that it continuously executes the position and orientation measurements in the time-axis direction. However, an input method of the approximate values of the position and orientation is not limited to this.

For example, a velocity or angular velocity of an object may be estimated using a time-series filter based on previous measurement values of the position and orientation to estimate a current position and orientation based on the previous position and orientation and the estimated velocity or acceleration.

Alternatively, images of a target object, which are captured at various orientations, may be held as templates, and template matching may be applied to an input image to estimate an approximate position and orientation of the target object.

Alternatively, where a sensor can measure a position and orientation of an object, output values of the sensor may be used as approximate values of the position and orientation. The sensor may be, for example, a magnetic sensor, which measures a position and orientation by detecting a magnetic field generated by a transmitter using a receiver attached to an object. Alternatively, the sensor may be an optical sensor, which measures a position and orientation by capturing an image of markers arranged on an object using a camera fixed to a scene. In addition, any other sensors may be used as long as they can measure a position and orientation of six degrees of freedom. Alternatively, when a position and orientation where an object is placed is known in advance, these values are used as approximate values.

(Step S2100)

Next, in step S2100, the image input unit 160 inputs a grayscale image and range image. The image input unit 160 acquires a grayscale image from the two-dimensional image sensing device 20 first. Likewise, the image input unit 160 acquires a range image from the range image sensing device 30.

In this embodiment, assume that a range image stores distances from the image sensing device to the surface of a measurement target object. As described above, since the optical axes of the two-dimensional image sensing device 20 and range image sensing device 30 are matched, the correspondence relationship between respective pixels of a grayscale image and those of a range image is given. Upon completion of acquisition of the grayscale image and range image, the process of step S2100 ends, and the process advances to step S2200.

(Step S2200)

Next, in step S2200, the position and orientation estimation unit 180 selects one viewpoint-dependent position and orientation estimation model from the position and orientation estimation models, thus obtaining geometric features grouped as the hierarchical structure in step S1400.

More specifically, the position and orientation estimation unit 180 selects a viewpoint-dependent position and orientation estimation model corresponding to a position and orientation most similar to the approximate position and orientation input in step S2000 from a plurality of viewpoint-dependent position and orientation estimation models saved as the position and orientation estimation models.

Upon selection of the most similar viewpoint-dependent position and orientation estimation model, orientation differences $\Delta R$ between the approximate position and orientation and those of the virtual image sensing device are calculated for a plurality of reference positions and orientations, and the model having the smallest difference value is selected. Alternatively, a position difference $\Delta T$ and orientation difference $\Delta R$ between the approximate position and orientation and reference position and orientation may be respectively calculated, positions and orientations of all the virtual image sensing devices may be respectively ranked in association with the values $\Delta T$ and $\Delta R$, and the model having the smallest sum of the ranks may be selected.

The selection method of the position and orientation estimation model is not limited to the aforementioned methods, and any other methods may be used as long as calculations are made based on the similarities between the approximate position and orientation and those of the virtual image sensing devices. That is, the selection method is not particularly limited. After one position and orientation estimation model is selected based on the approximate position and orientation from the position and orientation estimation models, the process of step S2200 ends, and the process advances to step S2300.

(Step S2300)

Next, in step S2300, the geometric feature selection unit 170 selects geometric features used in position and orientation calculations from those grouped as the hierarchical structure in the viewpoint-dependent mode saving unit 150.

In this embodiment, six clusters are extracted from geometric features grouped as the hierarchical structure. By randomly selecting one geometric feature from those of each extracted cluster, a total of six geometric features for position and orientation estimation are selected. By selecting geometric features from different clusters, those which do not have similar influences on the position and orientation parameters can be selected.

Note that the number of clusters to be extracted from the hierarchical structure and the number of geometric features to be used are not particularly limited except that at least six geometric features are typically required (since known position and orientation parameters have six respective degrees of freedom) so as to estimate a position and orientation.

For example, no problem is particularly posed when three clusters may be extracted, and two geometric features may be randomly selected from each cluster. A new setting unit used to set the number of clusters to be extracted and the number of geometric features to be selected may be added, and the numbers of clusters and geometric features may be arbitrarily set to execute estimation processing without losing the technical effect of the present embodiment.

In terms of processing efficiency, the number of geometric features to be selected can be six in the sense of a minimum required number. Also, the number of clusters to be extracted may be the same as the number of geometric features to be selected since it is desirable to select non-similar geometric features.

Note that a case in which the number of clusters to be extracted is too small (for example, 1) is synonymous with random selection of geometric features without grouping. Also, a case in which the number of clusters to be extracted is set to be the maximum number is the same as the position and orientation estimation using all the geometric features. For this reason in terms of processing efficiency, it is better that the number of clusters to be extracted is not too small or not too large. Thus, there is a design compromise between processing efficiency and estimation accuracy when deciding on the minimum number of clusters to be extracted.

(Step S2400)

Next, in step S2400, associations between the grayscale image and range image input in step S2100 and the line and plane geometric features selected in step S2300 are calculated, and a position and orientation of the measurement target object is estimated based on the association result. The position and orientation estimation processing to be executed by the position and orientation estimation unit 180 will be described in detail below.

Initially, based on the approximate position and orientation of the target object input in step S2000, a three-dimensional point group in the range image input in step S2100 are associated with the plane geometric features. Using the approximate position and orientation and intrinsic parameters of the calibrated range image sensing device 30, all the plane geometric features selected in step S2300 are projected onto the range image. Then, distance point groups on the range image corresponding to respective projected planes are held as three-dimensional points corresponding to the respective plane geometric features.

Next, edges on the grayscale image input in step S2100 are associated with the line geometric features. Using the approximate position and orientation and the intrinsic parameters of the calibrated two-dimensional image sensing device 20, all the line geometric features selected in step S2300 are projected onto the image, thereby associating edges detected on the image with the line geometric features. When a plurality of corresponding edges are detected for each line geometric feature, a closest edge on the image is associated with the projected line geometric feature.

Next, based on the associated data between the plane and line geometric features and the range and grayscale images, simultaneous equations are solved to minimize errors between measurement data and the geometric features, thus updating a position and orientation.

Note that since the distance on the image and that on the three-dimensional space have different scales, a contribution ratio places disproportionate weight on either of the measurement data even when simultaneous equations are simply solved. For this reason, in this embodiment, by executing optimization based on maximum likelihood estimation, as described in the following literature, position and orientation estimation is executed by adjusting the scales.

Tateno, Kotake, and Uchiyama, "A Model Fitting Method Using Intensity and Range Images for Bin-Picking Applications," 13th symposium on Meeting on Image Recognition and Understanding 2010 (MIRU2010).

The position and orientation estimation method based on the maximum likelihood estimation is not related to the gist of the present invention, and a description of detailed processing will not be given. Further details would be known the person skilled in the art from, for example, the aforementioned literature. Note that the position and orientation calculation method of the measurement target object is not limited to the aforementioned method. For example, iterative calculations based on the Levenberg-Marquardt method may be executed, or the steepest descent method may be used. Alternatively, other nonlinear optimization calculation methods such as a conjugate gradient method and ICCG method may be used.

(Step S2500)

It is determined in step S2400 whether or not the position and orientation updated in step S2400 have converged (that is, whether or not iterative calculations are required). It is determined that the position and orientation have converged when correction values are nearly zero or when a difference between square sums of error vectors before and after correction is nearly zero.

If the position and orientation have not converged yet, the process returns to step S2200, and the processing is executed from selection of a viewpoint-dependent position and orientation estimation model using the updated position and orientation. Note that when updated amounts of the position and orientation updated in step S2400 are small, the process may return to step S2400 to execute the position and orientation update processing using the same geometric features. If it is determined that the position and orientation has converged, this processing ends, and final estimated values of a relative position and orientation between the image sensing device and target object are decided.

As described above, according to this embodiment, since geometric feature groups having similar influences on estimation parameters of the six degrees of the position and orientation are grouped in advance, geometric features effective for estimation can be quickly selected in the position and orientation estimation processing. Thus, the position and orientation estimation can be efficiently executed based on a small number of geometric features without disproportionately using geometric features having similar influences on the position and orientation parameters.

First Modification

The aforementioned embodiment has explained the method based on hierarchical clustering using the Ward method as the geometric feature grouping method. However, the geometric feature grouping method is not limited to this.

Even when grouping is executed using the hierarchical clustering, similarity calculation methods such as a nearest neighbor method, farthest neighbor method, group average method, centroid method, median method, and flexible method other than the Ward method may be used in similarity calculations.

In addition to the hierarchical clustering, a non-hierarchical clustering method represented by k-means may be used. In this case, grouping processing can be executed as follows.

Letting M be the total number of groups, references $C_j$ (j=1, ..., M) of M groups are selected from Jacobians $J_i$ (i=1, ..., n) of all geometric features. Next, respective sample points i are classified into $C_j$ groups having a minimum distance $|J_i - C_j|$. Then, an average value of Jacobians of sample points which belong to each group is calculated, and the reference $C_j$ of that group is updated by the calculated average value. The aforementioned two processes, that is, classification and updating are iterated until $C_j$ need not be updated, thereby grouping geometric features.

The total number M of groups may be set in the same manner as the number of clusters to be extracted in step S2300 in the aforementioned embodiment, for example, the number of geometric features to be selected.

That is, when the number of geometric features to be selected is six, the total number M of groups may be set to be six. Note that the decision method and condition associated with the settings of the total number M of groups are the same as those of the settings of the number of clusters to be extracted in step S2300.

Second Modification

In the aforementioned embodiment, as a criterion for grouping of geometric features, geometric features having similar Jacobians of the geometric features are grouped. However, the criterion used upon grouping geometric features is not limited to this.

For example, geometric features having non-similar Jacobians may be grouped into one group. More specifically, grouping may be made by selecting clusters having a largest non-similarity $\Delta S_{AB}$ between clusters calculated in step S1420.

In this case, since geometric features corresponding to non-similar Jacobians are grouped into one group, geometric features corresponding to non-similar Jacobians are selected by randomly selecting geometric features from one cluster in step S2300.

As described above, the criterion upon grouping is not limited to the grouping method of grouping geometric features corresponding to similar Jacobians, and those corresponding to non-similar Jacobians may be clustered. The criterion is not particularly limited as long as the grouping criterion matches that upon selection of geometric features from the grouping result at the time of the position and orientation estimation, and any other criteria may be used in grouping, thus posing no problem.

Third Modification

In the aforementioned embodiment, only one set of geometric features used in the position and orientation estimation from the geometric feature groups, thereby executing the position and orientation estimation processing. However, the geometric feature selection method and position and orientation estimation processing method are not limited to this.

For example, a plurality of geometric feature sets may be prepared in a Random Access Consensus (RANSAC) manner, and a most proper geometric feature set may be discriminated by iterating the position and orientation calculations and evaluation of the result using each of the geometric feature sets, thereby executing processing for calculating a position and orientation.

More specifically, in step S2300, by iterating random selection of one geometric feature from those of respective clusters extracted from the hierarchical structure a plurality of times, a plurality of position and orientation calculation geometric feature sets each including six geometric features are prepared.

In step S2400, positions and orientations are respectively estimated for respective geometric feature sets selected in step S2300. Then, geometric features are projected onto an image again based on the estimated positions and orientations, and a position and orientation corresponding to the smallest sum total of inter-correspondence distances between geometric features and image features is selected as a most proper position and orientation.

As described above, the selection method of geometric features used in the position and orientation estimation, and the position and orientation estimation method using the selected geometric features are not limited to those of the aforementioned embodiment, and any other methods may be used as long as a position and orientation can be estimated based on selected geometric features.

Fourth Modification

In the aforementioned embodiment, the six degrees of freedom of the position and orientation of the measurement target object are calculated based on the association result between the geometric features an image. However, the position and orientation estimation method is not limited to the method of estimating all the six degrees of freedom of the position and orientation. For example, geometric features having similar influences on the six-degrees-of-freedom parameters of the position and orientation may be selected, and some of the six-degrees-of-freedom parameters of the position and orientation may be selected based on them.

More specifically, in step S2300, a plurality of (for example, six) geometric features are selected from those in a single cluster extracted from the hierarchical structure, thereby selecting geometric features having similar influences on the six-degrees-of-freedom parameters of the position and orientation.

Then, in step S2400, based on the association result between the selected geometric features and image, only position and orientation parameters to which the selected geometric features readily contribute are estimated. For example, when geometric features which readily contribute to an image plane X direction are selected, parameters to be estimated are limited to the image plane X direction. Since the method itself of estimating only some of position and orientation parameters is not essential to the gist of the present invention, a description of detailed processing will not be given.

As described above, the position and orientation estimation method of the present invention is not limited to the method of estimating all the six-degrees-of-freedom parameters of the position and orientation. Information to be estimated, and the position and orientation estimation method are not particularly limited as long as information of a position and/or orientation can be estimated based on selected geometric features, and any other methods can be used.

Fifth Modification

The aforementioned embodiment has explained the method based on the nonlinear least square method as the position and orientation estimation method based on the association result between the image and geometric features. However, the position and orientation estimation method to be applied to the information processing apparatus of the present invention is not limited to this.

For example, the present invention is applicable to a case in which a position and orientation is estimated using a time-series filter such as an extended Kalman filter based on the association result between the geometric features and image. When a position and orientation is estimated based on the time-series filter, it is possible to estimate a position and orientation from one geometric feature.

The position and orientation estimation based on one geometric feature estimates only parameters to which that geometric feature readily contribute of the six-degrees-of-freedom parameters of the position and orientation. For this reason, when only geometric features which readily contribute to estimation and correspond to similar degrees of freedom are selected, it is impossible to estimate all the six degrees of freedom of the position and orientation.

Therefore, when the position and orientation estimation is executed using the extended Kalman filter based on information of one geometric feature, an order of geometric features selected from the three-dimensional shape model is important for efficient estimation. Details of processing will be described below in association with a case in which the information processing apparatus of the present invention is applied to the position and orientation using the extended Kalman filter.

In step S2300, a geometric feature used to update a position and orientation is selected. In the aforementioned embodiment, six geometric features used in the position and orientation calculations are selected. However, in the position and orientation estimation based on the extended Kalman filter, at least one piece of information need only be selected to allow estimation. For this reason, in this modification, in the process of step S2300, one geometric feature is randomly selected.

Next, in step S2400, a position and orientation is updated by filtering processing based on the extended Kalman filter on the basis of the association result between the selected geometric feature and image. Since the calculation method itself of the extended Kalman filter based on the selected one geometric feature and associated data is not related to the gist of the present invention, a detailed description thereof will not be given. The skilled person would be aware of for example Y. Hel-Or, M. Werman, "Pose estimation by fusing noisy data of different dimensions," IEEE Transactions on Pattern Analysis and Machine Intelligence, vol. 17, no. 2, pp. 195-201, 1995. and thus a detailed description of the processing is not necessary. Upon completion of the position and orientation updating processing based on one geometric feature amount, whether or not to iterate the position and orientation updating processing is determined in step S2500.

As the determination method, for example, a limit of a processing time to be spent for the position and orientation processing is decided in advance, and the updating processing is iterated until the limit is reached. When the updating processing is to end, the current position and orientation is decided as the final position and orientation, thus ending the processing of the information processing apparatus 1. When the position and orientation updating processing is executed again, the process returns to step S2300, and a new geometric feature is selected. At this time, since that geometric feature is not selected from a cluster to which the previously selected geometric feature belongs, a geometric feature having a non-similar influence on the position and orientation estimation can be selected.

As described above, the position and orientation estimation method using geometric feature groups is not limited to the aforementioned embodiment. The position and orientation estimation method is not particularly limited as long as a position and orientation can be estimated using geometric features selected from geometric feature clusters, and any other methods may be used.

Sixth Modification

In the aforementioned embodiment and modifications, the nonlinear least square method and the method based on the time-series filter have been described as the position and orientation estimation method based on the association result between the image and geometric features. However, the position and orientation estimation method to be applied to the information processing apparatus of the present invention is not limited to these methods. For example, the present invention is applicable to a case in which a position and orientation is calculated by matching based on the association result between the geometric features and image.

In this case, for example, in step S2400, a large number of positions and orientations are generated as a position and orientation of the target object so as to exhaustively cover values of the six degrees of freedom within predetermined ranges to have the approximate position and orientation as the centers.

Next, by evaluating degrees of matching between geometric features corresponding to the generated positions and orientations, and the grayscale and range images, a position and orientation of the target object is estimated. More specifically, as settings of positions and orientations to be searched, values of all combinations of the six degrees of freedom of the position and orientation are set to have the input approximate position and orientation values as the centers. At this time, settings of a maximum width and step width of a position to be exhaustively set and those of an orientation to be exhaustively set are not particularly limited. In this modification, the positions and orientations to be searched are set by setting the maximum width of a position to be equal to the size of the target object, that of an orientation to be 90°, the step width of a position to be 1 mm, and that of an orientation to be 1°. Then, one set of the set position and orientation is selected, and a three-dimensional point group in the range image, edges on the grayscale image, and the selected geometric features are associated with each other based on the selected position and orientation.

Then, by calculating errors between measurement data and the geometric features based on associated data between the geometric features and the grayscale and range images, an evaluation value that represents a degree of matching is calculated. By applying the aforementioned processing to all the set positions and orientations, position and orientation values corresponding to a highest evaluation value are searched for.

Then, the position and orientation corresponding to the highest evaluation value are output as a final position and orientation of the target object. As described above, the position and orientation estimation method based on the selected geometric features is not limited to the least square method and the method based on the time-series filter. The position and orientation calculation method is not particularly limited as long as a position and orientation corresponding to the selected geometric features which apply to the grayscale and range image can be estimated, and any other methods may be used.

Seventh Modification

The aforementioned embodiment has been explained in which the grayscale and range images are captured. However, the information processing apparatus of the present invention is not limited to the case in which both the grayscale and range images are captured.

For example, the information processing apparatus of the present invention is applicable to a case in which only the range image is captured. An information processing apparatus of this modification has an arrangement in which the two-dimensional image sensing device 20 is removed from that shown in FIG. 1.

Also, the position and orientation estimation processing is the same as that of the aforementioned embodiment, except that the grayscale image input processing in step S2100 is omitted, and the association processing between the grayscale image and geometric features in step S2400 is omitted.

Likewise, the information processing apparatus of the present invention is applicable to a case in which only the grayscale image is captured. In this case, the information processing apparatus of this modification has an arrangement in which the range image sensing device 30 is removed from that shown in FIG. 1, and the position and orientation estimation processing is the same as that of the aforementioned embodiment, except that the range image input processing in step S2100 is omitted, and the association processing between the range image and geometric features in step S2400 is omitted.

Eighth Modification

The aforementioned embodiment has explained the grouping method based on Jacobians of geometric features as that of geometric features having similar influences on the position and orientation parameters in the geometric feature grouping unit 140. However, the geometric feature grouping method is not limited to the method according to similarities of Jacobians. For example of geometric features set on lines or planes of the three-dimensional shape model, those corresponding to similar angles or positions of the lines or planes are determined to have similar influences on the position and orientation parameters. Then, geometric features corresponding to similar angles or positions of the lines or planes may be grouped into a single group.

As described above, the information processing apparatus 1 according to the present invention is not limited to the case in which both the grayscale and range images are obtained, and is applicable without any problem as long as either one image is obtained.

Second Embodiment

Figure 8:
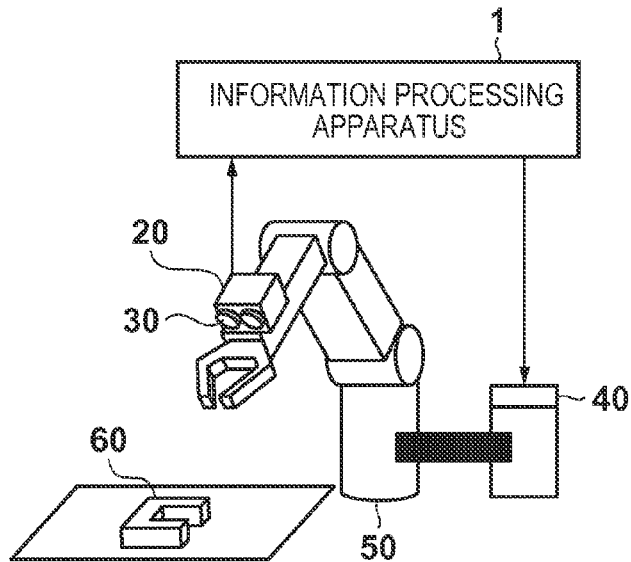
FIG. 8 is a view showing the arrangement of an information processing apparatus according to the second embodiment of the present invention.

As an application example of an information processing apparatus 1 according to the present invention, the following aspect may be used. That is, in one use example, a position and orientation of an object 60 to be measured is estimated based on a two-dimensional image and range image obtained by a two-dimensional image sensing device 20 and range image sensing device 30, and an industrial robot arm (robot 50) is controlled to grip that object based on the estimated position and orientation. An application example of the information processing apparatus 1 according to another embodiment of the present invention will be described below with reference to FIG. 8. FIG. 8 shows an arrangement example of a robot system in which the object 60 to be measured is gripped using the information processing apparatus 1 and robot 50.

The robot 50 is controlled by a robot controller 40 to move its hand to an instructed position so as to grip an object. Since the position of the object 60 to be measured on a work table is changed, the current position and orientation of the object 60 to be measured has to be estimated to execute gripping control of the robot.

The two-dimensional image sensing device 20 is a camera used to capture a normal two-dimensional image and the range image sensing device 30 is a range sensor used to measure distances to an object surface. These image sensing devices are arranged at a position of the hand of the industrial robot arm, where they capture images of the object 60 to be measured.

The information processing apparatus 1 estimates the position and orientation of the object 60 to be measured based on a two-dimensional image and range image obtained from the two-dimensional image sensing device 20 and range image sensing device 30. The position and orientation of the object 60 to be measured, which is estimated by the information processing apparatus 1, is input to the robot controller 40, thereby controlling the robot to, for example, grip the object 60 to be measured. Since an information processing apparatus of the present invention estimates the position and orientation of the object 60 to be measured, the robot system can grip the object 60 to be measured even when the position of the object 60 to be measured is indeterminate.

The embodiments have been described in detail, but the present invention can adopt, for example, embodiment in the form of a system, apparatus, method, program, storage medium, or the like. More specifically, the present invention may be applied to either a system including a plurality of devices or an apparatus consisting of a single device.

Note that the present invention includes a case in which the functions of the aforementioned embodiments are achieved when a software program is directly or remotely supplied to a system or apparatus, and a computer of that system or apparatus reads out and executes the supplied program code. In this case, the supplied program is a computer program corresponding to the flowchart shown in the drawing in the embodiments.

Therefore, in order to implement the functional processing of the present invention using a computer, the program code itself installed in the computer implements the present invention. That is, the present invention includes the computer program itself required to implement the functional processing of the present invention.

In this case, the form of the program may be an object code, a program executed by an interpreter, or script data to be supplied to an OS as long as they have functions of the program.

A computer-readable storage medium required to supply the computer program includes, for example, a Floppy® disk, hard disk, optical disk, magnetooptical disk, MO, CD-ROM, CD-R, CD-RW, magnetic tape, nonvolatile memory card, ROM, DVD (DVD-ROM, DVD-R), and the like.

In addition, as the program supply method, a connection may be established to a homepage on the Internet using a browser of a client computer, and the computer program of the present invention may be downloaded from the homepage to a recording medium such as a hard disk. In this case, the program to be downloaded may be a compressed file including an automatic installation function. Program codes included in the program of embodiments of the present invention are divided into a plurality of files, and the respective files may be downloaded from different homepages, thus implementing embodiments of the present invention. That is, a WWW server which allows a plurality of users to download the program file required to implement the functional processing by computers is included in embodiments of the present invention.

Also, the encrypted program in embodiments of the present invention may be stored in a storage medium such as a CD-ROM, which may be delivered to users. In this case, the user who has cleared a predetermined condition is allowed to download key information required to decrypt the encrypted program from a homepage via the Internet, and to execute the program decrypted using the key information, thus installing the program in a computer.

The functions of the aforementioned embodiments can be implemented when a computer executes the readout program. In addition, the functions of the embodiments may be implemented in cooperation with an OS or the like, which is running on the computer, based on instructions of that program. In this case, the OS or the like executes some or all of actual processes, thereby implementing the functions of the aforementioned embodiments.

Furthermore, the program read out from the recording medium may be written in a memory included in a function expansion board inserted in a computer or a function expansion unit connected to the computer, thus implementing some or all of the functions of the aforementioned embodiments. In this case, after the program is written in the function expansion board or unit, a CPU or the like included in that function expansion board or unit executes some or all of actual processes based on instruction of that program.

As described above, according to the embodiments, image features to be used are decided using a reference image whose position and orientation is given (a captured image obtained by capturing an image of a viewing target object in a previous frame or a model image set with texture data). Then, using such image features, a position and orientation of an image sensing device associated with a current frame is calculated, thus improving stability of the position and orientation estimation. That is, according to the embodiments, when three-dimensional line segment models extracted from three-dimensional model data of a viewing target object are considerably different from features which can be extracted from the viewing target object in the captured image, the position and orientation can be stably estimated. Using features based on surface colors of the viewing target object in addition to geometric features extracted from a three-dimensional model, the position and orientation can be estimated using information which is not included in the three-dimensional model data.

Third Embodiment

This embodiment estimates a position and orientation of an object to be measured as a position and orientation estimation target by model fitting using a three-dimensional shape model having the same shape as the object to be measured. In association processing of this embodiment, the following processing is executed first. That is, positions, on a captured image, of geometric features (sample points set on linen segments and planes of a three-dimensional shape model in this embodiment) of the three-dimensional shape model are calculated based on approximate values of a position and orientation (position and orientation approximate values) of an object to be measured with respect an image sensing device used to capture an image of the object to be measured. Next, points corresponding to the sample points (corresponding points) are searched for from the captured image, and distances between the sample points and corresponding points (inter-correspondence distances) are calculated. Assume that this captured image includes a grayscale image and range image in this embodiment.

In this embodiment, outliers mixed in the association result are precisely removed. For this purpose, in this embodiment, before the corresponding points corresponding to the sample points are searched for, and the inter-correspondence distances are calculated, "sample points are classified so that sample points for which similar inter-correspondence distances are predicted belong to identical groups". Then, after the corresponding points corresponding to the sample points are searched for, the search results (association results) are determined for respective groups.

In a single group, it is expected that inter-correspondence distances of correctly associated sample points are similar to each other. Assuming that outliers in the association result are in a minority, after the sample points are associated in each group, correspondences having similar inter-correspondence distances in a group are unlikely to be outliers, and those having inter-correspondence distances different from these similar distances are more likely to be outliers. Thus, outliers are determined based on inter-correspondence distance distributions of the respective groups, and the position and orientation estimation with high precision and robustness is executed using inter-correspondence distances other than outliers.

Note that in order to estimate a position and orientation of a component as an object to be measured, a three-dimensional shape model having the same shape as the component is projected onto an image including the component, and the component and three-dimensional shape model are associated with each other on the image. At this time, a case of association processing based on a conventional method will be described below with reference to FIG. 9.

Figure 9:
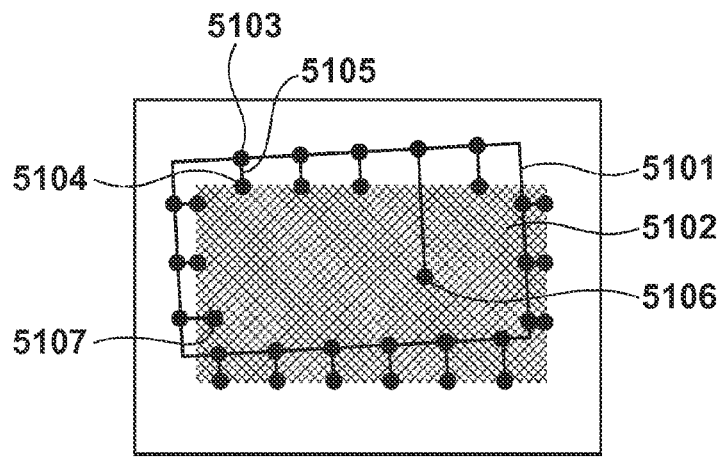
FIG. 9 is a view for explaining association.

As shown in FIG. 9, a component 5102 appears in an image. Also, a three-dimensional shape model, which is projected onto the image based on position and orientation approximate values of the component 5102, is displayed to be superimposed on the component 5102. However, the shape model in FIG. 9 is displayed for the sake of descriptive convenience. The shape model is not projected onto the image in practice, and positions of sample points on the image are calculated. In association processing, points corresponding to sample points 5103 on a three-dimensional shape model 5101 are searched for to detect corresponding points. In FIG. 9, as corresponding points, points 5104 on sides of the component 5102 are searched for. Next, lengths of line segments, which connect the sample points 5103 and points 5104, are calculated as inter-correspondence distances 5105.

Note that FIG. 9 shows points 5106 and 5107, which are erroneously associated as corresponding points, as outliers. Since inter-correspondence distances of all sample points are statistically used to determine outliers, it is easily to determine a correspondence having a largely different inter-correspondence distance from other sample points like the point 5106. However, it is difficult to determine a correspondence having an inter-correspondence distance closer to a statistically standard inter-correspondence distance like the point 5107.

Figure 10:
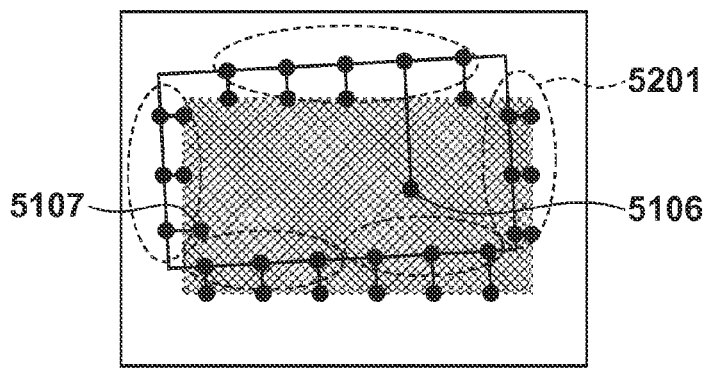
FIG. 10 is a view for explaining grouping.

By contrast, in FIG. 10, sample points are grouped, and outliers are determined for respective groups. Grouping is executed so that sample points, which are expected to have similar inter-correspondence distances are classified into an identical group. For example, adjacent sample points on a single line segment are classified into a single group like a group 5201. As can be seen from FIG. 10, correctly associated sample points are expected to have similar inter-correspondence distances in a single group. Therefore, when outlier determination is executed for each group, even an outlier having a small deviation like the point 5107 can be determined with high reliability.

Figure 11:
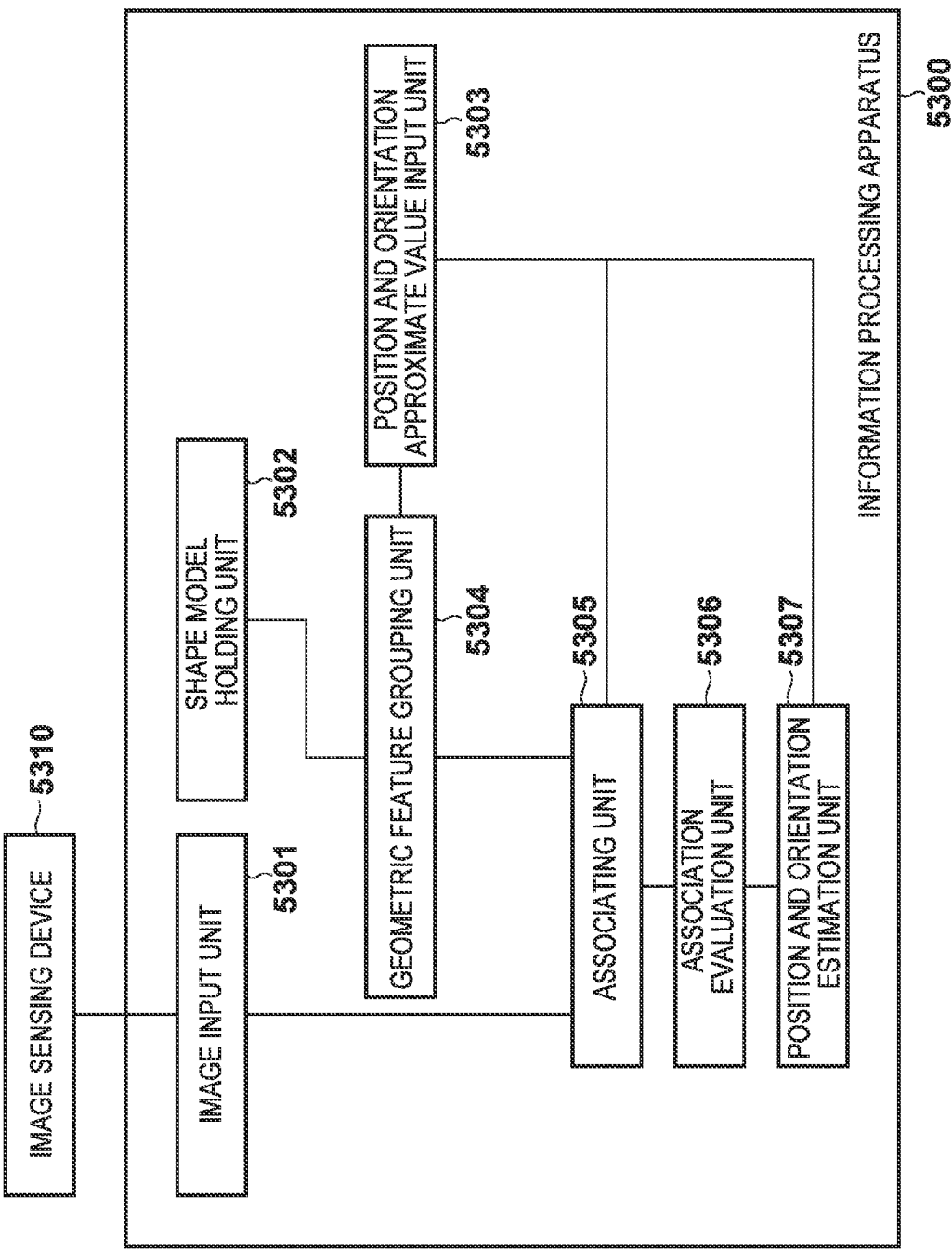
FIG. 11 is a block diagram for explaining an example of the functional arrangement of an information processing apparatus 5300.

An example of the functional arrangement of an information processing apparatus according to this embodiment will be described below with reference to the block diagram shown in FIG. 11. As shown in FIG. 11, an image sensing device 5310 is connected to an information processing apparatus 5300. The image sensing device 5310 will be described first.

The image sensing device 5310 has a camera function required to capture a two-dimensional image of a scene, and a range sensor required to acquire a range image. In this embodiment, assume that the image sensing device 5310 captures an image of an object to be measured.

The two-dimensional image may be either a grayscale image or color image. The following description will be given under the assumption that the two-dimensional image is a grayscale image. Intrinsic parameters such as a focal length and principal point position of a camera used to capture an image, and lens distortion parameters are calibrated in advance by a method described in the following literature:

R. Y. Tsai, "A versatile camera calibration technique for high-accuracy 3D machine vision metrology using off-the-shelf cameras and lenses," IEEE Journal of Robotics and Automation, vol. RA-3, no. 4, 1987.

As the range sensor, an active type sensor which captures reflected light of a laser beam, with which a target (an object to be measured in this case) is irradiated, and measures distances by triangulation is used. However, the range sensor is not limited to this, and any other sensors may be used as long as they measure a range image. Assume that a relative position and orientation between the camera and range sensor is fixed, and is calibrated in advance. For example, the following calibration method can be used. That is, in this method, a calibration object, a three-dimensional shape of which is given, is viewed from various directions, and a relative position and orientation is calculated from differences between the position and orientation of the calibration object based on the two-dimensional image and that of the calibration object based on the range image.

The two-dimensional image and range image obtained by the image sensing device 5310 are input to the information processing apparatus 5300. Note that these two-dimensional image and range image may be captured in advance, and may be stored in an arbitrary storage device. In this case, the two-dimensional image and range image are input from this storage device to the information processing apparatus 5300. That is, the acquisition method of the two-dimensional image and range image by the information processing apparatus 5300 is not limited to a specific method. However, in any case, assume that position and orientation approximate values of an object to be measured with respect to the device which captures the two-dimensional image and range image are input from a position and orientation approximate value input unit 5303 (to be described later). The position and orientation approximate values are also those of a viewpoint with respect to an object to be measured with reference to the object to be measured.

The information processing apparatus 5300 will be described below. The two-dimensional image and range image output from the image sensing device 5310 are input to an association unit 5305 via an image input unit 5301.

A shape model holding unit 5302 holds three-dimensional shape model information (model information) of the same shape as that of an object to be measured, and position information of respective sample points set in advance on the three-dimensional shape model.

A three-dimensional shape model to be expressed by the model information includes, for example, that based on three-dimensional CAD data. More specifically, three-dimensional shape model includes a CAD model itself which can be handled by three-dimensional CAD software or a model including a plurality of polygon elements, which are used in used in the computer graphics field, and are obtained by converting a three-dimensional CAD Mode. The following description will be given under the assumption that the three-dimensional model is a model including a plurality of polygons. A configuration example of the model information used in this embodiment will be described below with reference to FIGS. 12A to 12F.

Figure 12C:
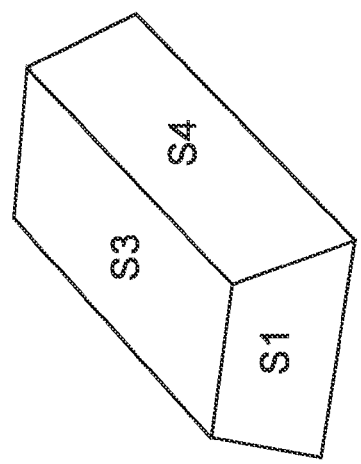
Figure 12B:
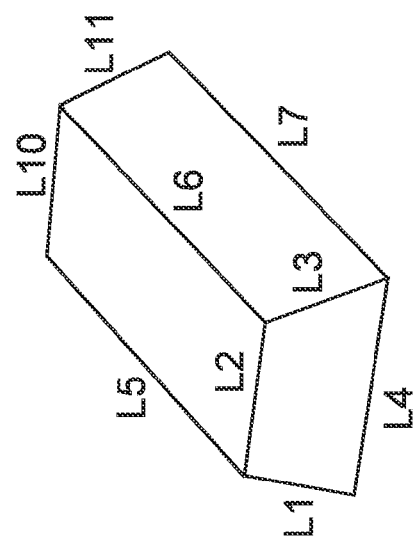
Figure 12A:
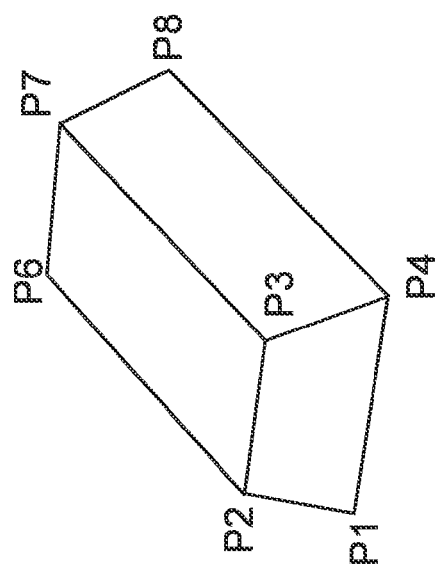

The three-dimensional model includes elements such as points, lines (sides), and planes, as shown in FIGS. 12A to 12F. FIGS. 12A to 12C show the same three-dimensional shape model. FIGS. 12A to 12C show vertices, sides, and planes when viewed from a certain viewpoint, and do not show those which cannot be viewed from this viewpoint.

As shown in FIGS. 12D to 12F, model information of such three-dimensional shape model includes indices and coordinate values of respective vertices, indices of respective sides and those of vertices of two ends of each of these sides, indices of respective planes, those of sides of each of these planes, and normal vector components. The coordinate value of each vertex may be set with reference to a local origin of the three-dimensional shape model, or a point to be used as a reference point is not particularly limited. The same applies to position information of each sample point to be described below.

Sample points include points (line sample points) set on sides of the three-dimensional shape model so as to be associated with edge features of a grayscale image, and points (plane sample points) set on planes of the three-dimensional shape model so as to be associated with three-dimensional points in a range image.

In this case, different sample points can be used in association processing depending on the ways lines and planes on an image of the three-dimensional shape mode are viewed. For example, when the three-dimensional shape model is projected onto an image, as shown in FIGS. 12A to 12C, vertices P1 to P4 and P6 to P8 are viewable, but a vertex P5 is not viewable. Also, sides L1 to L7, L10, and L11 are viewable, but sides L8, L9, and L12 are not viewable. Furthermore, planes S1, S3, and S4 are viewable, but planes S2, S5, and S6 are not viewable.

Therefore, sides and planes, which are viewable on the three-dimensional shape model from a plurality of viewpoints set on respective vertices of a geodesic sphere which encloses the three-dimensional shape model, are extracted in advance, and sample points are set on them. Positions of a sample point group viewable at each viewpoint are held as a viewpoint-dependent data set. Thus, sample point groups corresponding to various position and orientation relationships between viewpoints and the three-dimensional shape model can be acquired.

The position and orientation approximate value input unit 5303 acquires position and orientation approximate values of an object to be measured with respect to the image sensing device 5310. Assume that the position and orientation approximate values are determined in advance by pre-processing such as template matching with respect to a grayscale image. When the position and orientation estimation processing is sequentially iterated, results estimated in the immediately preceding position and orientation estimation processing may be used as position and orientation approximate values without arranging the position and orientation approximate value input unit 5303.

A geometric feature grouping unit 5304 acquires a sample point group corresponding to the position and orientation approximate values input from the position and orientation approximate value input unit 5303 of those (position information groups) for respective viewpoints, which are held by the shape model holding unit 5302, from the shape model holding unit 5302. Then, the geometric feature grouping unit 5304 classifies the sample point group acquired from the shape model holding unit 5302 into a plurality of groups, so that "sample points expected to have similar inter-correspondence distances are classified into an identical group". However, since the inter-correspondence distances have different scales depending on images to be associated, line sample points to be associated with edge features of a grayscale image and plane sample points to be associated with a three-dimensional point group of a range image are independently grouped.

The association unit 5305 associates the respective sample points classified by the geometric feature grouping unit 5304 with a grayscale image and range image received from the image input unit 5301 to search for corresponding points, thus calculating inter-correspondence distances between the sample points and corresponding points.

An association evaluation unit 5306 evaluates the inter-correspondence distances of the sample points calculated by the association unit 5305 for each group, and specifies inter-correspondence distances calculated for the corresponding points other than those as outliers as inter-correspondence distances used in model fitting.

A position and orientation estimation unit 5307 corrects the position and orientation approximate values input form the position and orientation approximate value input unit 5303 by the inter-correspondence distances specified by the association evaluation unit 5306, thereby calculating a final position and orientation with higher precision of the object to be measured.

Processing to be executed by the information processing apparatus 5300 to estimate the position and orientation of the object to be measured using model fitting will be described below with reference to FIG. 13 which shows the flowchart of that processing.

<Step S5501>

The image input unit 5301 acquires a grayscale image and range image of the object to be measured, which are output from the image sensing device 5310. A set of the grayscale image and range image may be input only once, but may be input continuously. For the latter case, the following processes are applied to each set.

<Step S5502>

The geometric feature grouping unit 5304 acquires position and orientation approximate values from the position and orientation approximate value input unit 5303.

<Step S5503>

The geometric feature grouping unit 5304 acquires, from the shape model holding unit 5302, a sample point group corresponding to the position and orientation approximate values acquired from the position and orientation approximate value input unit 5303 of those (position information groups) for respective viewpoints, which are held by the shape model holding unit 5302. That is, the unit 5304 acquires a sample point group acquired from a viewpoint closest to the position and orientation approximate values acquired from the position and orientation approximate value input unit 5303 of the respective vertices of the geodesic sphere.

Then, the geometric feature grouping unit 5304 classifies the sample point group acquired from the shape model holding unit 5302 into a plurality of groups. A method of classifying the sample point group into each of the plurality of groups will be described below.

The grouping processing is executed to classify sample points expected to have similar inter-correspondence distances into a single group. Since a similarity of an inter-correspondence distance is related to, for example, a Jacobian of a sample points, the sample points can be grouped based on similarities of Jacobians. Note that the Jacobian means a matrix of primary partial differentials which express how an inter-correspondence distance increases/decreases with respect to minimal changes of six degrees of freedom of a position and orientation.

Similarities of inter-correspondence distances which can be determined from the Jacobians of sample points will be described below. A case will be examined below wherein a three-dimensional shape model is projected onto an image to have certain position and orientation approximate values x, and sample points on the projected three-dimensional shape model are associated with an object to be measured having position and orientation true values $x_c$. In the association processing, a corresponding point is searched for to have each sample point as a base point, and their distance is calculated on a space of the association processing. An inter-correspondence distance $\Delta z_i$ calculated for a sample point i (i=1, ..., n) is defined by:

$$\Delta z_i = h(x_c, i) - h(x, i) \tag{6}$$

where h is a formula for converting a position of a sample point on the three-dimensional shape model onto the association space. Note that on the association space, a sample point position $h(x_c, i)$ based on the position and orientation true values is expressed as an ideal corresponding point position with respect to a sample point position $h(x, i)$ based on the position and orientation approximate values. The inter-correspondence distance $\Delta z_i$ nonlinearly increases/decreases according to a deviation amount $\Delta x = (x - x_c)$ of the position and orientation approximate values x. However, assuming that $\Delta x$ is minimal, linear approximation using a primary partial differential (Jacobian) of $h(x, i)$ can express equation (6) above as:

$$\Delta z_i \cong H_i \cdot (x_C - x) = H_i \cdot \Delta x \tag{7}$$
$$H_i = \frac{\partial h(x, i)}{\partial (x)}$$

where $H_i$ represents how an inter-correspondence distance to be measured increases/decreases with respect to minimal changes of six degrees of freedom of the position and orientation approximate values. As can be seen from equations (7), since $\Delta x$ assumes a constant value independently of a sample point, the inter-correspondence distance $\Delta z_i$ calculated from each sample point follows that Jacobian $H_i$. That is, by grouping the sample points based on similarities of Jacobians, they can be classified into a sample point group expected to have similar inter-correspondence distances.

Details of the method of classifying sample points based on similarities of Jacobians will be described below. In this embodiment, the grouping method based on the k-means method will be described. However, the grouping method is not limited to that based on the k-means method, and any other methods may be used as long as they can classify sample points of similar Jacobians into a single group.

Let $H_i$ be a Jacobian of a sample point i to be grouped, and M (M is a natural number equal to or larger than 2) be the total number of groups. Initially, M Jacobians (representative Jacobians) are selected from n Jacobians. The M Jacobians may be selected randomly or in a prescribed order.

Then, selected M Jacobians HS(1) to HS(M) are respectively set as criteria C(1) to C(M) of M groups G1 to GM (that is, C(j)=HS(j), j=1, . . . , M).

Next, as process 1, each sample point i is classified into a group Cj corresponding to a minimum distance |Hi−C(j)|. Note that this distance |Hi−C(j)| means a Mahalanobis' distance normalized by a covariance matrix of Jacobians Hi.

Next, as process 2, an average value of Jacobians of all sample points classified into group j is calculated, and C(j) is updated by the calculated average value. Then, processes 1 and 2 are iterated until C(j) is no longer updated. With these processes, the sample point group can be grouped based on similarities of expected inter-correspondence distances.

<Step S5504>

The association unit 5305 executes association processing of the respective sample points acquired from the shape model holding unit 5302 in step S5503 so as to search for corresponding points of the sample points, thus calculating distances (inter-correspondence distances) to the found corresponding points. This association processing is independently applied to the grayscale image and range image.

That is, when such association processing is applied to the grayscale image, edge features on the grayscale image are searched for as corresponding points from line sample points, and inter-correspondence distances between the found corresponding points and line sample points are calculated.

Also, when such association processing is applied to the range image, corresponding points in the depth direction of the range image are searched for from plane sample points, and inter-correspondence distances between the found corresponding points and plane sample points are calculated. As for details of the corresponding point search method, please refer to, for example, <Literature 1> Tateno, Kotake, and Uchiyama, "A Model Fitting Method Using Intensity and Range Images for Bin-Picking Applications," 13th Meeting on Image Recognition and Understanding (MIRU2010), OS5-1, 2010.

<Step S5505>

The association evaluation unit 5306 specifies inter-correspondence distances used in model fitting by evaluating the inter-correspondence distances calculated for respective sample points by the association unit 5305. The inter-correspondence distances are evaluated for each group.

Since correctly associated sample points in a single group are expected to have similar inter-correspondence distances, outliers are determined with reference to degrees of differences of respective inter-correspondence distances from a standard value of the inter-correspondence distance distribution obtained by the association processing. Details of the processing of the determination method will be described below.

Let Dk (k=1, . . . , l: l is the number of sample points (inter-correspondence distances) which belong to a single group) be inter-correspondence distances calculated from the sample point group which belongs to that group. Then, a median Dm of Dk is set as a standard value (reference distance) of the inter-correspondence distance distribution. For all "k"s which satisfy k=1, . . . , l, |Dk−Dm| is calculated, and when this calculation result is equal to or larger than a threshold T (equal to or larger than a prescribed or predetermined value), an outlier is determined, and it is determined that Dk is not used in model fitting. On the other hand, when |Dk−Dm| is less than the threshold T (less than the prescribed value), a non-outlier is determined, and it is determined that Dk is used in model fitting.

Note that |Dk−Dm| is calculated as the Mahalanobis' generalized distance based on variance values of Dk. Also, the measurement method of the standard value of the inter-correspondence distance distribution of the single group is not limited to the method which sets the aforementioned median. For example, an average value may be used.

<Step S5506>

The position and orientation estimation unit 5307 corrects the position and orientation approximate values acquired from the position and orientation approximate value input unit 5303 using the inter-correspondence distances determined to be used in model fitting by the association evaluation unit 5306, thereby estimating a position and orientation with higher precision. A correction amount is calculated by calculating a solution of the least square method of the inter-correspondence distances. Since the position and orientation estimation algorithm based on the least square method is not related to the gist of the present invention, a detailed description thereof will not be given. As for details of the processing, the skilled person would be aware of, for example, the subject matter of literature 1 above. Note that the position and orientation estimation method is not limited to the least square method, and any other methods may be used as long as they can correct a position and orientation so as to reduce associated inter-correspondence distances.

As described above, according to this embodiment, the association results are evaluated for each group, outliers to be mixed can be removed, and the position and orientation estimation is executed using inter-correspondence distances from which outliers are removed. Thus, position and orientation estimation processing with high precision and robustness can be attained.

Fourth Embodiment

In this embodiment, inter-correspondence distances are weighted according to differences from an inter-correspondence distance Dm of a reference sample point in a single group. By executing position and orientation estimation using inter-correspondence distances according to weights, position and orientation estimation processing with high precision and robustness is attained. Details of weighting processing will be described below.

Let Dk (k=1, . . . , l: l is the number of sample points (inter-correspondence distances) which belong to a single group) be inter-correspondence distances calculated from the sample point group which belongs to that group. Then, a median Dm of Dk is set as a standard value of the inter-correspondence distance distribution. For all "k"s which satisfy k=1, . . . , l, a difference |Dk−Dm| is calculated. From the difference, a weight value specified by the Tukey's function is calculated, and Dk is weighted by the calculated weight value. The Tukey's function is expressed by:

$$w(D_k) = \begin{cases} \left(1 - \left(\frac{|D_m - D_k|}{W}\right)^2\right)^2 & |D_m - D_k| \leq W \\ 0 & |D_m - D_k| > W \end{cases} \quad (8)$$

where $w(D_k)$ is a weight value for Dk, and W is a constant. Note that the function which gives a weight value need not be the Tukey's function, and any other functions such as the Huber function may be used as long as they give a large weight value for Dk corresponding to a small difference from the median Dm, and give a small weight value for Dk corresponding to a large difference.

Then, a position and orientation is corrected so as to minimize inter-correspondence distances of respective sample points according to the obtained weights. The position and orientation estimation method according to the weight is not related to the gist of the present invention. The skilled person would be aware of, for example, literature 1 which describes a practical correction method.

As described above, according to this embodiment, the association results are weighted by being evaluated for each group, and the position and orientation estimation is then executed using the inter-correspondence distances according to the weights. Thus the influence of outliers is reduced thereby allowing the position and orientation estimation processing with high precision and robustness.

First Modification of Third and Fourth Embodiments

The third and fourth embodiments are premised on that both the grayscale image and range image are input. However, in other embodiments only one of the grayscale image and range image may be input. In this case, the processing described in the third and fourth embodiments need only be applied to the one input image.

Second Modification of Third and Fourth Embodiments

In the third and fourth embodiments, the geometric feature grouping unit 5304 classifies sample points into groups during the sequence of the processing. However, this grouping processing may be executed in advance for respective viewpoints. In this case, the geometric feature grouping unit 5304 acquires the result of the grouping processing executed in advance based on a viewpoint closest to the position and orientation approximate values acquired from the position and orientation approximate value input unit 5303. The grouping results which are obtained in advance for respective viewpoints are stored in an appropriate memory such as the shape model holding unit 5302.

Third Modification of Third and Fourth Embodiments

The third and fourth embodiments have explained a case in which the geometric feature grouping unit 5304 executes grouping according to similarities of Jacobians of sample points in order to group sample points expected to have similar inter-correspondence distances. However, the grouping method of sample points is not limited to that according to similarities of Jacobians. For example, assume that sample points corresponding to similar angles or positions of lines or planes of those set on lines or planes of a three-dimensional shape model are expected to have similar inter-correspondence distances. Then, grouping may be executed so that sample points corresponding to similar angles or positions of lines or planes are classified into a single group.

Fourth Modification of Third and Fourth Embodiments

In the third and fourth embodiments, sample points set on a three-dimensional shape model are used as geometric features of the three-dimensional shape model to provide a reference for the association processing. However, the geometric features are not limited to sample points, and any other geometric features may be used as long as a correspondence relationship between features on an image and those on a three-dimensional shape model can be searched. For example, lines or planes themselves of a three-dimensional shape model can be used as geometric features in place of sample points, and associated with similar features on an image, thus calculating inter-correspondence distances. In this case, the geometric features are grouped so that geometric features corresponding to similar Jacobians or similar angles or positions of lines or planes are classified into a single group.

Fifth Embodiment

This embodiment will explain an application example of the information processing apparatus 5300 of the third and fourth embodiments (including the modifications). In one application example of the information processing apparatus 5300, a position and orientation of an object to be measured is estimated based on a two-dimensional image and range image obtained from an image sensing device 5310. An industrial robot arm grips the object. This example will be described below with reference to FIG. 14.

Figure 14:
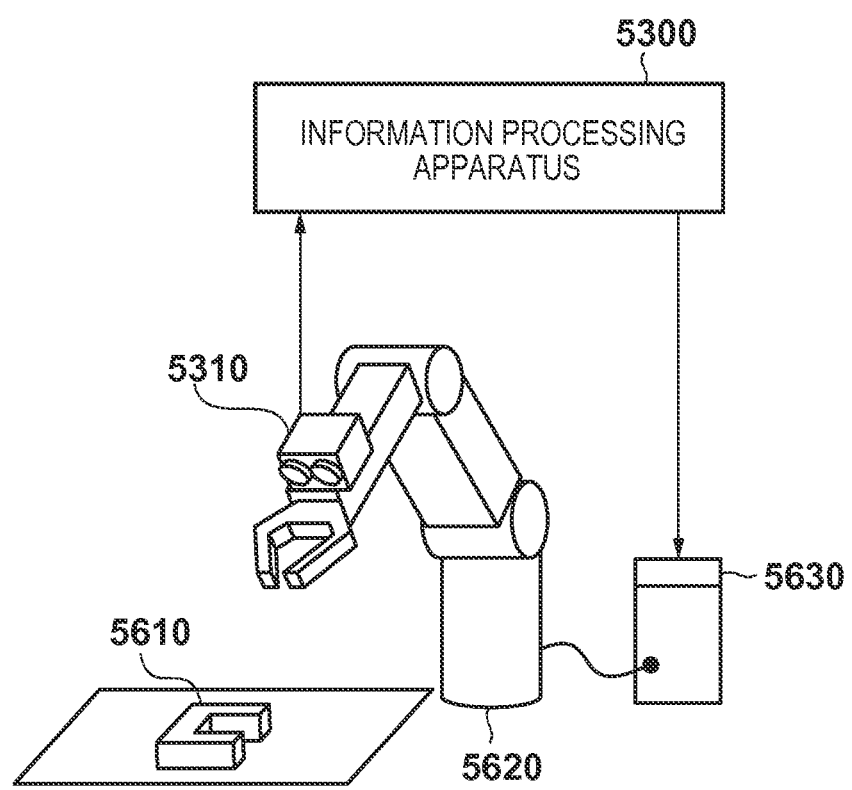
FIG. 14 is a view showing an example of the arrangement of a robot system.

FIG. 14 shows an example of the arrangement of a robot system in which an object 5610 to be measured is gripped using the information processing apparatus 5300 and a robot 5620. The robot 5620 is controlled by a robot controller 5630, moves a hand of a robot arm to a position designated by the robot controller 5630, and grips an object at an orientation designated by the robot controller 5630.

Since the position and orientation of the object 5610 to be measured is changed every time that object is placed on a work table, the current position and orientation of the object 5610 to be measured has to be estimated, and gripping control required to grip the object located at the estimated position at the estimated orientation has to be executed. The image sensing device 5310 is set at a position of the hand of the industrial robot arm where it can capture an image of the object 5610 to be measured.

The information processing apparatus 5300 estimates the position and orientation of the object 5610 to be measured based on a two-dimensional image and range image obtained from the image sensing device 5310. The position and orientation of the object 5610 to be measured, which is estimated by the information processing apparatus 5300 is input (output) to the robot controller 5630. The robot controller 5630 controls the robot 5620 (robot arm) to grip the object 5610 to be measured located at the input position and orientation. Thus, the robot system can grip the object to be measured by executing the position and orientation estimation even when the position of the object to be measured is indeterminate.

Sixth Embodiment

All of the units included in the information processing apparatus 5300 shown in FIG. 11 may be implemented by hardware components. However, the image input unit 5301, geometric feature grouping unit 5304, position and orientation approximate value input unit 5303, association unit 5305, association evaluation unit 5306, and position and orientation estimation unit 5307 may be implemented by software, and the shape model holding unit 5302 may be implemented by a memory. In this case, this software (computer program) is installed in a computer such as a PC having this memory, and a CPU of this computer executes the software, thereby implementing the operations of these units.

The third to sixth embodiments have explained various information processing apparatuses and their application examples. However, such information processing apparatus is merely embodiments of the following arrangement: that is, an information processing apparatus which estimates a position and orientation of an object to be measured by associating a plurality of geometric features set on a shape model of the object to be measured with an image including the object to be measured.

Then, this information processing apparatus may classify the geometric features on the shape model into a plurality of groups (geometric feature classification, searches the image for correspondences of the geometric features on the shape model, and calculates inter-correspondence distances between the geometric features and correspondences (association). Then, the apparatus may evaluate the correspondences for each group of the geometric features (correspondence evaluation), and estimates a position and orientation of the object to be measured based on the inter-correspondence distances and correspondence evaluation results. Note that based on the calculated position and orientation, a robot having movable axes including rotation and/or translation axes may be manipulated. Also, both the position and orientation need not be estimated, and only one of them may be estimated.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-056489 filed Mar. 13, 2012 and 2012-167647 filed Jul. 27, 2012 which are hereby incorporated by reference herein in their entirety.

What is claimed is:

1. A model generation method for execution by a model generation apparatus, the model generation method comprising:

inputting a three-dimensional shape model of a target object including (1) plane geometric features and (2) line geometric features;

setting a plurality of positions and orientations of a viewpoint, the viewpoint being used to observe the three-dimensional shape model of the target object, and sequentially selecting one of the plurality of positions and orientations of the viewpoint;

calculating, for the selected one of the plurality of positions and orientations of the viewpoint set in the setting and for the plane geometric features and the line geometric features, respectively, a degree of change of a relationship between image features of an image to be observed at the viewpoint and each of the plane geometric features and the line geometric features of the three-dimensional shape model when the selected position and orientation of the viewpoint or a position and orientation of the target object is changed; and generating a hierarchical cluster of plane geometric features and a hierarchical cluster of line geometric features, separately, for the selected one of the plurality of positions and orientations of the viewpoint, by setting each of the plane geometric features and each of the line geometric features as an initial cluster in a lowest layer, and sequentially merging a pair of clusters in a current layer to generate a cluster in a higher layer based on similarity of the degree of change of the relationship calculated for the pair of clusters.

2. The model generation method according to claim 1, further comprising:

selecting, from the plurality of positions and orientations of the viewpoint set in the setting, at least one position and orientation of an image sensing device, wherein, in the generating, the plane geometric features are grouped based on the degree of change of the relationship between image features of the image to be observed by an image sensing device and the plane geometric features of the three-dimensional shape model when (a) the position and orientation of the image sensing device selected by the selecting or (b) the position and orientation of the target object is changed.

3. The model generation method according to claim 1, wherein, in the generating, Jacobians of the plane geometric features of the three-dimensional shape model of the target object are calculated as a value which indicates a degree of change of a relationship between image features of an image to be observed at the viewpoint and the plane geometric features of the three-dimensional shape model, wherein the plane geometric features of the three-dimensional shape model of the target object are to be grouped in a mapping relationship of the three-dimensional shape model of the target object onto the image to be observed at the viewpoint, and wherein, in the generating, the geometric features are grouped based on similarity of the calculated Jacobians.

4. The model generation method according to claim 1, wherein, in the setting, the three-dimensional shape model of the target object is further enclosed by a sphere, latitudes and longitudes are assigned to the sphere, and virtual positions and orientations of an image sensing device are set using the assigned latitudes and longitudes.

5. The model generation method according to claim 1, wherein the image to be observed comprises one or both of a two-dimensional image and a range image.

6. The model generation method according to claim 1, further comprising:

saving, as a viewpoint-dependent model, a set of a result of the generating and the viewpoint for observing the three-dimensional shape model of the target object.

7. A non-transitory computer-readable storage medium storing a computer program which upon execution enables a computer to carry out the steps of:

inputting a three-dimensional shape model of a target object including (1) plane geometric features and (2) line geometric features;

setting a plurality of positions and orientations of a viewpoint, the viewpoint being used to observe the three-dimensional shape model of the target object, and sequentially selecting one of the plurality of positions and orientations of the viewpoint;

calculating, for the selected one of the plurality of positions and orientations of the viewpoint set in the setting and for the plane geometric features and the line geometric features, respectively, a degree of change of a relationship between image features of an image to be observed at the viewpoint and each of the plane geometric features and the line geometric features of the three-dimensional shape model when the selected position and orientation of the viewpoint or a position and orientation of the target object is changed; and generating a hierarchical cluster of plane geometric features and a hierarchical cluster of line geometric features, separately, for the selected one of the plurality of positions and orientations of the viewpoint, by setting each of the plane geometric features and each of the line geometric features as an initial cluster in a lowest layer, and sequentially merging a pair of clusters in a current layer to generate a cluster in a higher layer based on similarity of the degree of change of the relationship calculated for the pair of clusters.

8. A model generation apparatus comprising:
one or more processors; and
a memory coupled to the one or more processors and having instructions stored thereon, wherein the instructions, when executed by the one or more processors, cause the model generation apparatus to:

(1) input a three-dimensional shape model of a target object including (1) plane geometric features and (2) line geometric features;

(2) set a plurality of positions and orientations of a viewpoint, the viewpoint being used to observe the three-dimensional shape model of the target object, and sequentially selecting one of the plurality of positions and orientations of the viewpoint;

(3) calculate, for the selected one of the plurality of positions and orientations of the viewpoint set in the setting and for the plane geometric features and the line geometric features, respectively, a degree of change of a relationship between image features of an image to be observed at the viewpoint and each of the plane geometric features and the line geometric features of the three-dimensional shape model when the selected position and orientation of the viewpoint or a position and orientation of the target object is changed; and generate a hierarchical cluster of plane geometric features and a hierarchical cluster of line geometric features, separately, for the selected one of the plurality of positions and orientations of the viewpoint, by setting each of the plane geometric features and each of the line geometric features as an initial cluster in a lowest layer, and sequentially merging a pair of clusters in a current layer to generate a cluster in a higher layer based on similarity of the degree of change of the relationship calculated for the pair of clusters.

* * * * *